United States Patent
Rusu

(10) Patent No.: US 7,252,322 B2
(45) Date of Patent: Aug. 7, 2007

(54) HARD TONNEAU COVER

(76) Inventor: William Rusu, 6741 Langtoft, W. Bloomfield, MI (US) 48324

( * ) Notice: Subject to any disclaimer, the term of this patent is extended or adjusted under 35 U.S.C. 154(b) by 0 days.

(21) Appl. No.: 11/501,204

(22) Filed: Aug. 8, 2006

(65) Prior Publication Data

US 2007/0035151 A1    Feb. 15, 2007

Related U.S. Application Data

(62) Division of application No. 10/776,019, filed on Feb. 9, 2004, now Pat. No. 7,093,881.

(60) Provisional application No. 60/455,999, filed on Feb. 7, 2003.

(51) Int. Cl.
*B60P 7/02* (2006.01)

(52) U.S. Cl. .............................. 296/100.07; 296/100.17

(58) Field of Classification Search ........... 296/100.01, 296/100.06, 100.17, 100.09, 100.02, 100.08
See application file for complete search history.

(56) References Cited

U.S. PATENT DOCUMENTS

| | | | | |
|---|---|---|---|---|
| 5,427,428 A | * | 6/1995 | Ericson et al. ............... | 296/98 |
| 5,526,866 A | * | 6/1996 | Flentge ................... | 296/100.18 |
| 5,636,893 A | * | 6/1997 | Wheatley et al. ........ | 296/100.07 |
| 5,984,379 A | * | 11/1999 | Michel et al. ......... | 296/100.16 |
| 6,053,557 A | * | 4/2000 | Kooiker ................. | 296/100.06 |
| 6,053,558 A | * | 4/2000 | Weldy et al. .......... | 296/100.17 |
| 6,129,407 A | * | 10/2000 | Kooiker ................. | 296/100.07 |
| 6,227,602 B1 | * | 5/2001 | Bogard ................... | 296/100.07 |
| 6,427,500 B1 | * | 8/2002 | Weinerman et al. ... | 296/100.07 |
| 6,488,329 B1 | * | 12/2002 | Smith .................... | 296/100.07 |
| 6,533,343 B2 | * | 3/2003 | Bohm et al. ........... | 296/100.02 |
| 6,543,836 B1 | * | 4/2003 | Wheatley ............... | 296/100.18 |
| 6,712,418 B1 | * | 3/2004 | Lathers .................. | 296/100.02 |

\* cited by examiner

*Primary Examiner*—Kiran B. Patel
(74) *Attorney, Agent, or Firm*—John R. Benefiel

(57) ABSTRACT

A hard tonneau cover having one or more sections is constructed of a framework of extruded rails with one or more section panels held by molded plastic trim strips installed on perimeter rails included in the framework. The cover is mounted above the cargo box of a pick-up truck by a plurality of striker-latch assemblies on one side of the cargo box, and hinge assemblies on the other side, each having components mounted to the cargo box side walls with universal clamp brackets. The panels are constructed of reinforced corrugated plastic which is covered by a color integrated film. A simplified connector plate is used to connect abutting ends of the rails in the framework. A peripheral seal extends down from the perimeter rails in which it is mounted to engage the top of the cargo box side walls and tailgate. Water drainage paths including drainage channels in the rails are provided to eliminate water from the panel surfaces.

4 Claims, 24 Drawing Sheets

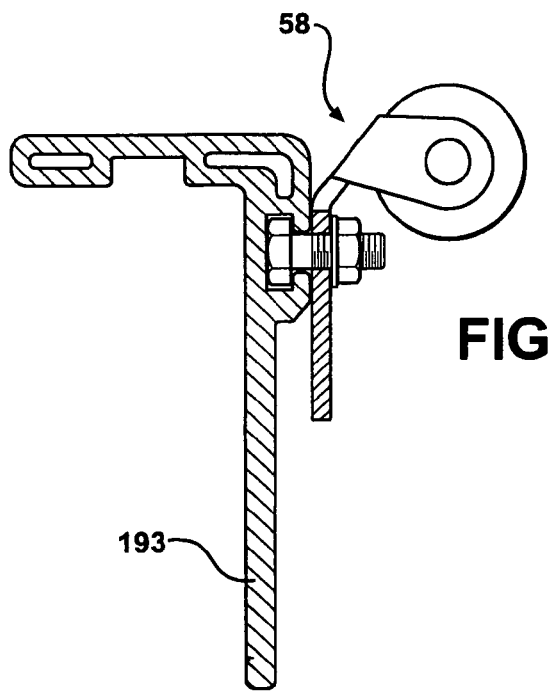
FIG - 26A
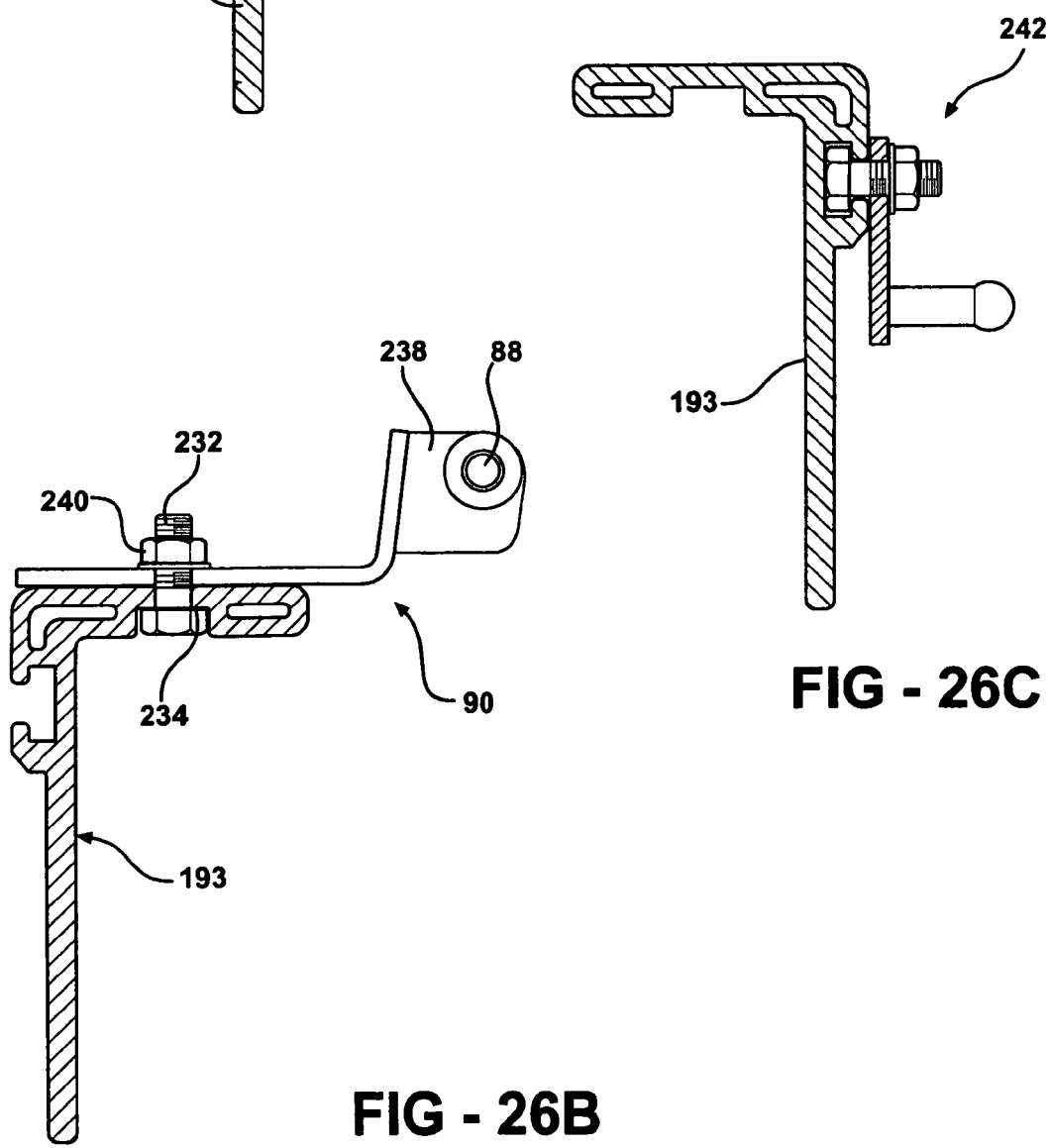
FIG - 26C
FIG - 26B

HARD TONNEAU COVER

CROSS REFERENCE TO RELATED APPLICATIONS

This invention is a Division of U.S. Ser. No. 10/776,019, filed Feb. 9, 2004, now U.S. Pat. No. 7,093,881 and also claims the benefit of U.S. provisional Ser. No. 60/455,999, filed Feb. 7, 2003.

BACKGROUND OF THE INVENTION

This invention concerns hard cover tonneaus for the cargo box of pick-up trucks. In such tonneau covers, one or more panel sections are mounted on the side walls of the cargo box, and are hinged to allow raising of one end or side of the cover sections which may also be disconnected from the cargo box for removal. Such covers have typically been specifically been designed for a particular cargo bed configuration, and have involved heavy panels of fiber glass reinforced molded resins.

Such hard covers are typically fit over plastic protection covers on the cargo box, and hinged to be raised for access to the cargo area, with gas struts used to support the weight of the opened cover.

The heavy weight of these tonneau covers has been an increasing disadvantage as this reduces fuel economy and truck net payload capacity.

The proliferation of pick-up truck cargo box configurations has led to increased costs due to the need for a greater number of custom designed covers.

U.S. Pat. No. 6,082,806 suggests a construction using a tubular frame and thin panels fixed to the frame, allowing easy modification to fit various cargo bed sizes.

However, such an approach requires painting of the aluminum frame. The cover panel affixed to the frame is subject to buckling due to temperature induced expansion and is difficult to replace if damaged.

It would be desirable to be able to match the quality of cover finish to vehicle finish, but this has heretofore not been possible due to the difficulty in obtaining a distortion free cover surface acceptable to the automobile manufacturers.

Another difficulty has to do with the service wear on the components and the mating sheet metal surfaces due to the severe deflections of the cargo box during driving of the truck, particularly over rough roads and long periods of time. Such wear occurs in the striker bars and hinges, and also where a cover seal scrubs against the cargo box painted sheet metal.

Another problem is found in draining water from the cover to prevent leakage into the cargo box. While attempts have been made to seal all the joints, some seepage still occurs, and any bonding of a cover panel needed to create a seal will create thermally induced distortions as mentioned above.

Installation and removal of the tonneau cover is often time consuming due to the need to accurately align the cover with the cargo box and the need for installing or removing numerous cover mounting components and fasteners.

It is the object of the present invention to provide a hard tonneau cover for a pick-up truck cargo box which is light weight and low in cost to manufacture, but which has a high quality appearance compatible with the factory finish of the truck body.

It is another object of the present invention to provide a tonneau cover which can be readily sized and configured to be matched to a great variety of cargo box sizes and configurations, and having an easily adjustable mounting system so that the cover may be readily installed in the proper position on the cargo box.

It is a further object to provide a hard tonneau cover which can withstand extended service in the field while maintaining proper function of the components, and a good appearance while avoiding excessive wear of the truck body finish.

Yet another object is to provide a hard tonneau cover which incorporates a water drainage system which directs water off the cover to prevent any water from penetrating into the cargo box, and which channels any seepage along a path formed in the cover components away from the cargo area.

SUMMARY OF THE INVENTION

The above recited objects and other objects which will become apparent upon a reading of the following specification and claims are achieved by a hard tonneau cover including a frame made up of a series of perimeter rails which can be cut to a selected size and assembled together into a rectangular framework using corner pieces affixed to adjoining ends of rails defining each corner. The perimeter rails are provided with inwardly protruding panel support ledges with an adjacent outer channel.

A rectangular panel sized to rest atop the support ledge of the perimeter rails is nonfixedly held on the framework with an edge clearance space allowing for thermal expansion. The panel is preferably constructed from an "S-flute" corrugated plastic core having additional strengthening thin sheets of a suitable plastic or resin laminated onto each face. A covering color integrated plastic film providing a desired color and finish is loose lay installed over the reinforced core to achieve an OEM compatible finish. Alternatively, the film can be bonded to the panel.

The perimeter rails are also each formed with one or more longitudinal outer slots which can slidably receive a one or two colored plastic trim strips extending along and covering each rail so that the rails need not be painted.

The trim strips each include an inwardly extending lip overlying the perimeter of the panel to nonfixedly secure the panel in position be and sealed against the panel. A skirt portion of a single trim strip or a separate trim strip extends downwardly below the perimeter rail and outside the cargo box engaging peripheral seal extending along the bottom of the perimeter rail so that a finished appearance is presented.

A matching molded plastic corner is attached to framework corner pieces at the outer corners of the rail framework, the corner overlapping the trim strips at the corners and securing the trim strips in place.

The perimeter rails and corner pieces also are each formed with a longitudinal lower slot which receives a top bead on the elastomeric peripheral seal which has a pair of spaced ribs engaging the cargo box surfaces to create a seal which is sufficiently compressible to accommodate tilt-up of the tonneau cover, and which prevents entrance of dirt. The ribs are maintained in contact with the cargo box surfaces to prevent scrubbing.

The panel supporting perimeter rail ledge has a downwardly facing tee slot underneath which receives bolt heads for mounting support brackets for hinges, latches, gas strut mounts, and connections to crossing rails and struts, anchor brackets, etc.

One or more crossing rails and struts extend between the perimeter rails at adjustably set positions by means of connector plates receiving bolts retained in perimeter rail tee slots and nuts, creating a sturdy but light weight framework for supporting the panel. A central rail extends in a lengthwise direction from a perimeter end rail to a crossing rail, and the crossing struts are mounted thereto and to an adjacent perimeter side rail.

Both the central and crossing rails may be of an extrusion of identical cross section.

A series of universal clamp-on hinge latch fittings mount to the lip of the cargo box walls at any selected position, while mating strikers or hinges are attached by a cover bracket to the perimeter rails using bolts on the ledge rail slots having head received. The same brackets bolted to the perimeter are used to connect crossing slots in rails to the perimeter rails by bolts held in slots in the crossing rails. Quick disconnect hinge pins and strikers attach the cover to the cargo box by being mated to hinge brackets and latch assemblies on the cover.

The perimeter rails have water channels receiving water seepage passing the trim strips overlying the panel perimeter and direct the same down to the corner pieces, which also receive water passing beneath the corners, the water passing down a descending contour of the corner pieces to drain out at a point past the peripheral seal.

The tonneau cover can be configured in various ways, such as with two raisable cover sections, each section with separate rail frameworks. In this configuration, a fixed center section divides the cargo box into two areas, each occupied by front and rear cover sections. The rear cover section in this design may be hinged to the fixed center section by two hinge assemblies allowing the rear cover section to be raised up.

The forward panel section may be tilted up on one side by the clamp on hinge and latch brackets.

Gas struts are mounted to brackets secured to the cover section rails and a clamp on brackets on the cargo box to hold the cover in a raised position.

Trim strips are mated to slots in either side of the fixed center section which overly the adjacent edges of the panel of the front and rear cover sections which also are each formed as transverse water drain gutters which extend to end covers and a cup piece to drain water passing out from the channels past the perimeter of the cargo box seal.

The crossing rails are bowed to create a crowning of the cover to insure rapid draining of water from the cover.

DESCRIPTION OF THE DRAWINGS

FIGS. 26A, 26B, 26C are side views of an angle piece part of a universal clamp on bracket with a hinge, striker, and gas strut anchor shown respectively installed thereon.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to drawing FIGS. 1-5, the present invention comprises a hard tonneau cover, in which a substantially rigid covering is provided for pick-up cargo box depicted in phantom lines.

Figure 1:
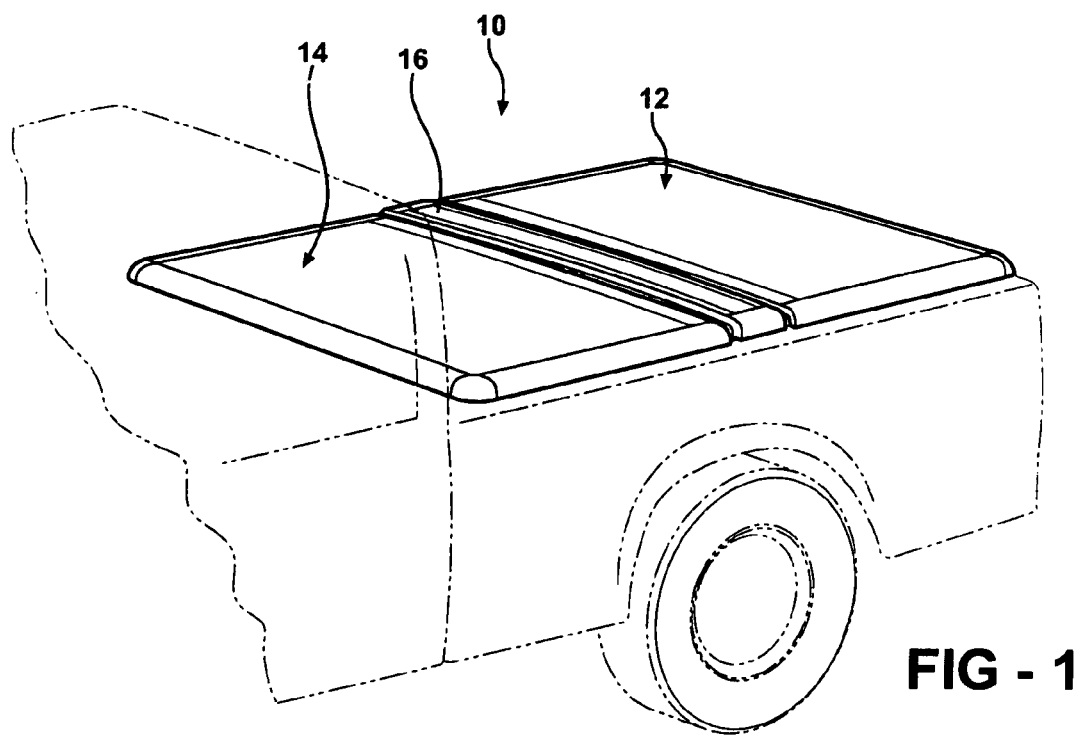
FIG. 1 is a pictorial view of a hard tonneau cover using two openable and one fixed cover sections according to the invention shown installed on the cargo box of a pick-up truck depicted in phantom lines.
Figure 2:
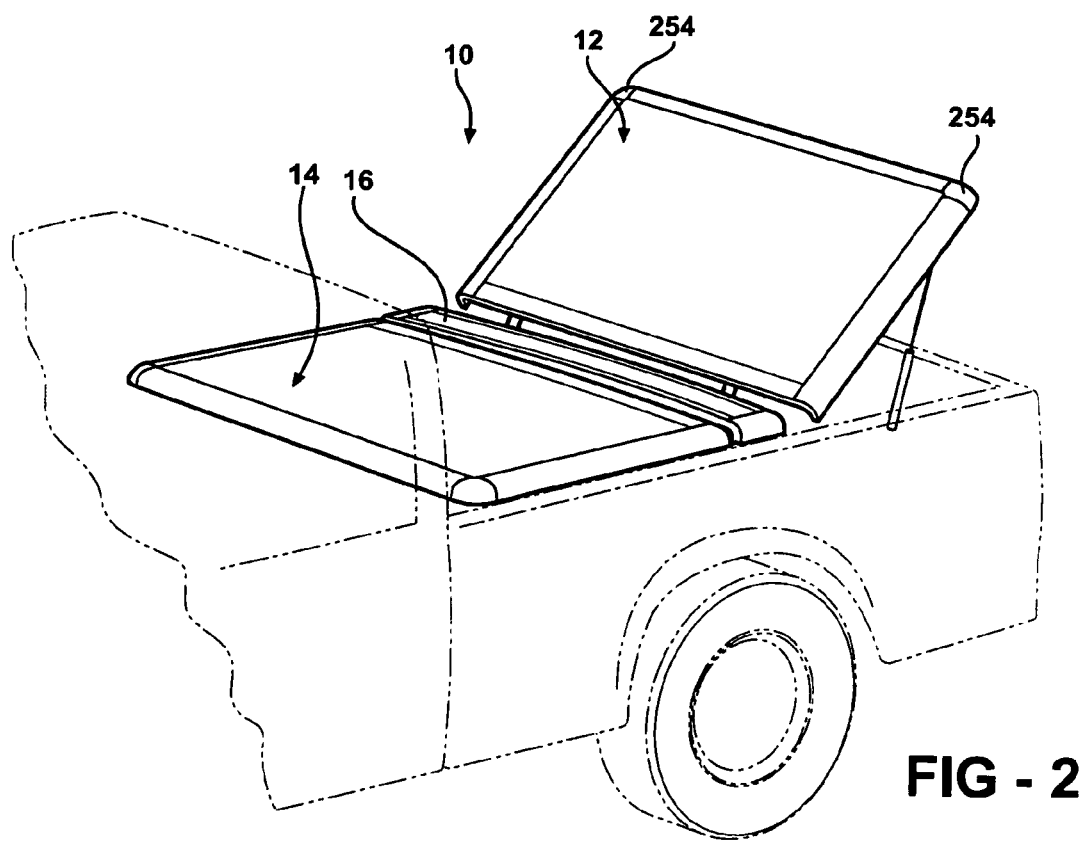
FIG. 2 is a pictorial view of the hard tonneau cover system shown in FIG. 1 with the rear cover section in a tilted up position.

The tonneau cover may be in multiple sections as for example, the three section cover 10 shown in FIGS. 1 and 2, which includes the separately hinged rear cover section 12 and forward cover section 14. The rear cover section 12 is mounted on hinges (described below) at the rear side of a fixed center section 16 lying between the two cover sections 12, 14 so as to be able to be tilted up as seen in FIG. 2, with gas struts 20 used to hold the rear cover section 12 in the up position shown.

Figure 3:
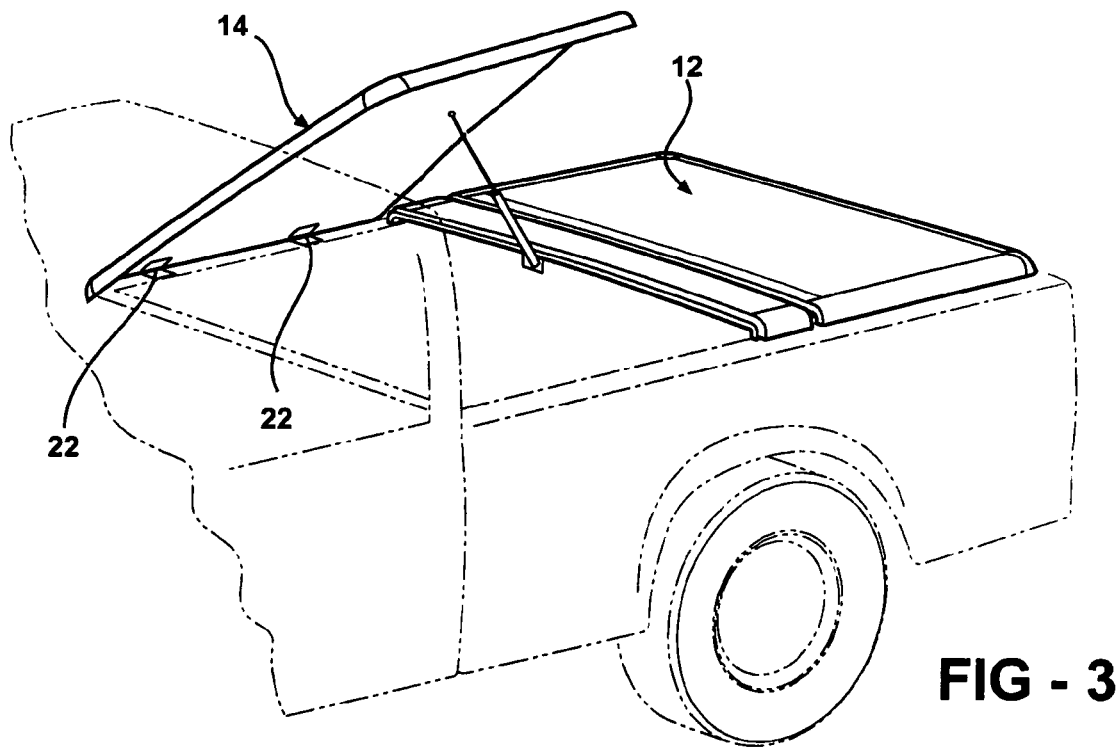
FIG. 3 is a pictorial view of the hard tonneau cover system shown in FIGS. 1 and 2 with the front cover section shown tilted up from the right side.
Figure 4:
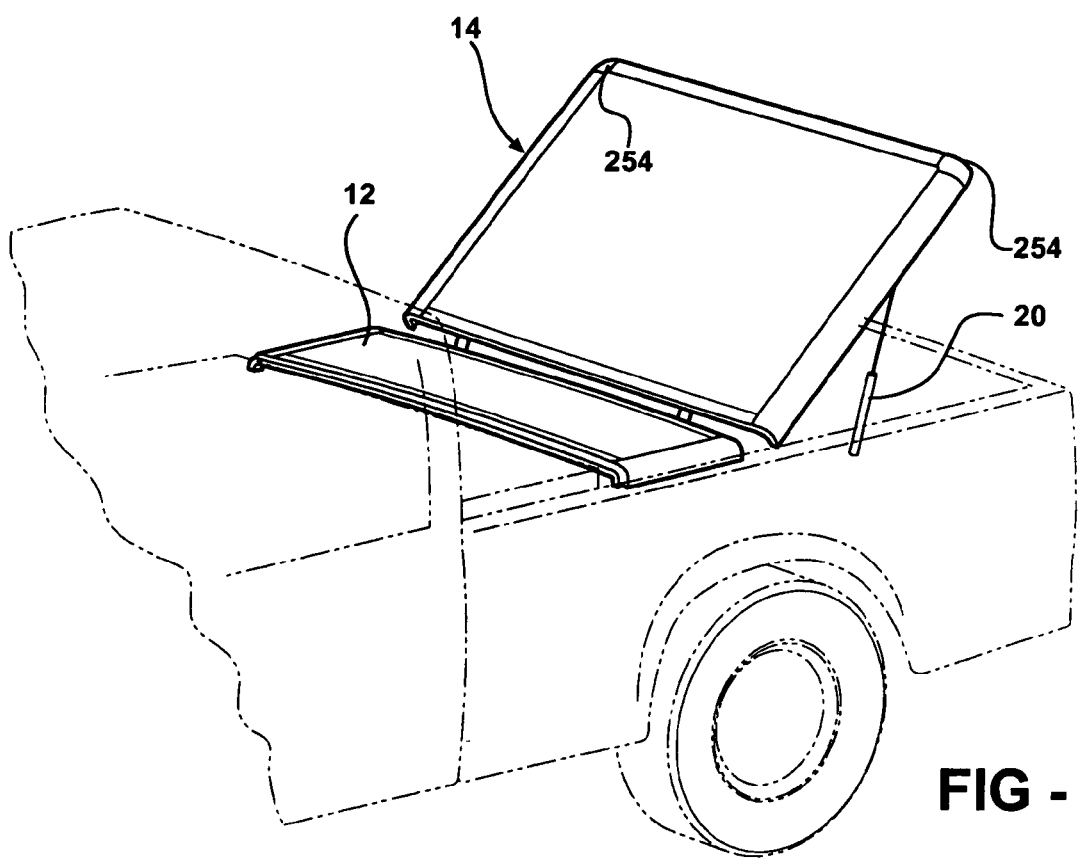
FIG. 4 is a pictorial view of the hard tonneau cover with the rear cover section tilted up on hinges connected to a fixed.

The forward cover section 14 is mounted by hinge pin assemblies 22 having hinge pins received in brackets mounted either side of the cargo box by a clamp on mount as will be described in detail hereinafter, so as to be readily installed in switchable positions to be able to be tilted up on either the left or right side, as seen in FIG. 3 or 4.

Latch-striker assemblies not shown in FIGS. 1-6 secure the cover section sides opposite the hinges, with the strikers also mounted to the cargo box using the universal mounting as is described in detail below. A single gas strut 20 is used to hold the forward cover section open.

Figure 5:
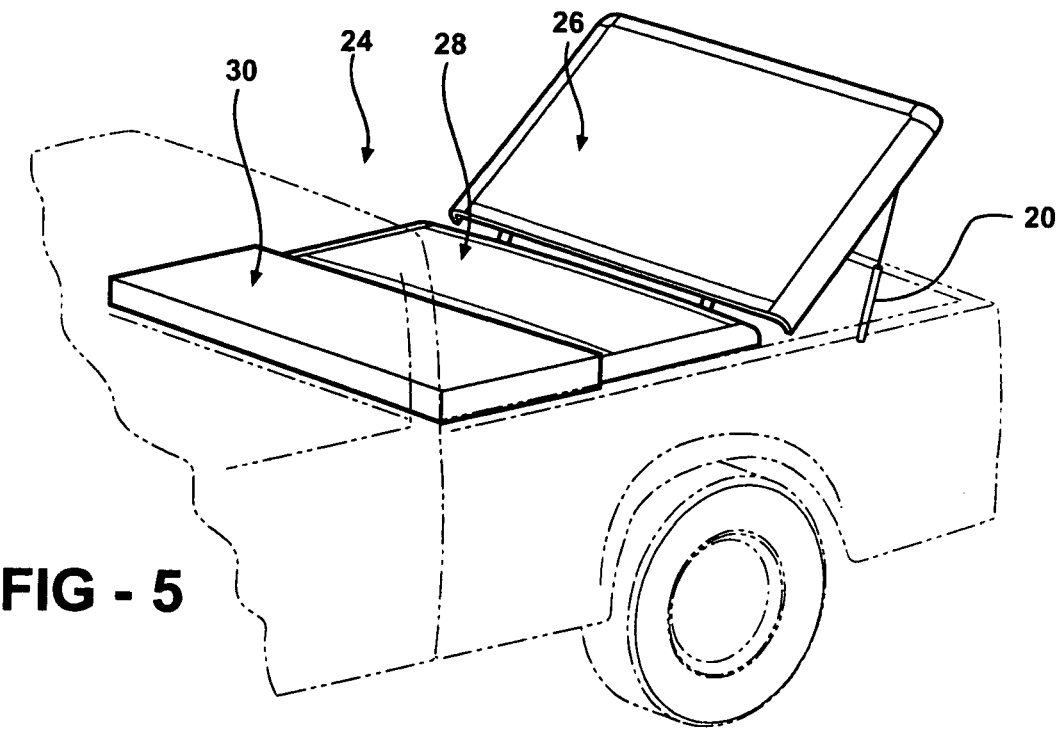
FIG. 5 is a pictorial view of another embodiment of the hard tonneau cover according to the invention shown with a single openable cover section and a tool box mounted forwardly therefrom.

FIG. 5 shows a larger single openable section cover 24, having a single cover section 26 hinged to a fixed central section 28 along a forward side. A tool box 30 is installed in the cargo box area forward of the fixed section 28.

Figure 6:
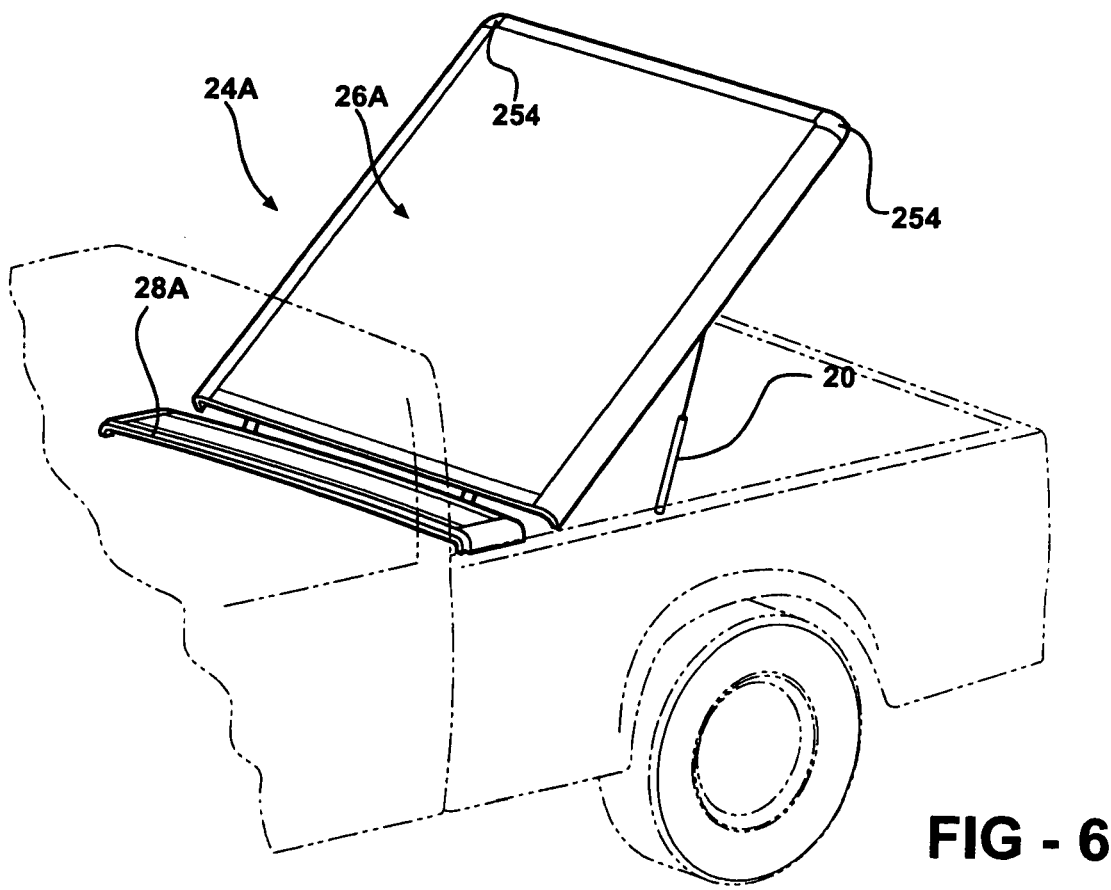
FIG. 6 is a pictorial view of a single cover section tonneau cover according to the invention.

FIG. 6 shows a cover 24A with a larger single openable section 26A and a fixed section 28A.

Other cover arrangements are also possible such as a side hinged rear section (not shown).

Figure 7:
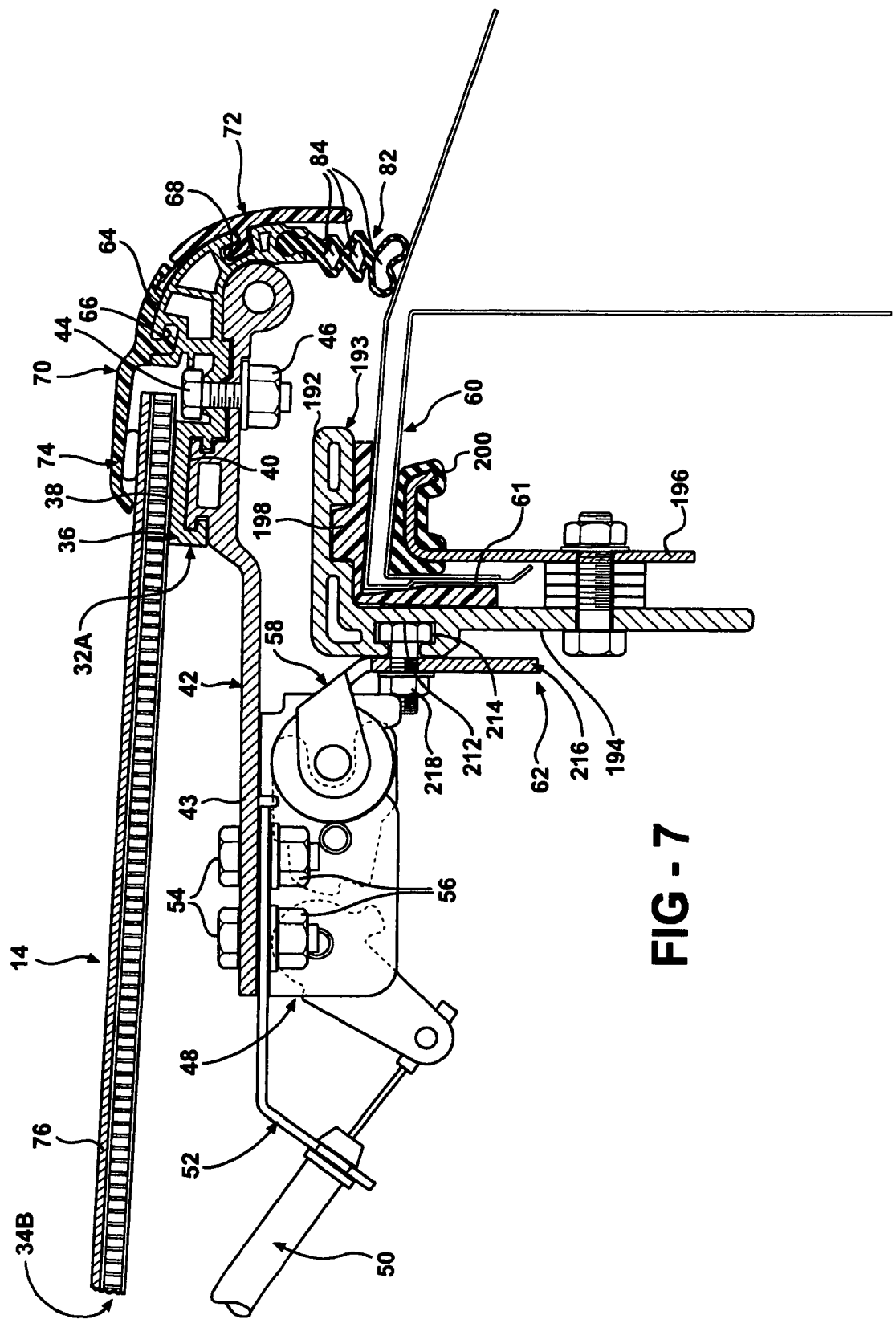
FIG. 7 is a sectional view of a portion of a cover section of the hard tonneau cover according to the invention showing a striker installation on a universal mounting bracket and a mating latch mechanism mounted side thereof.

FIG. 7 shows some of the construction details of the tonneau cover 10. An extruded aluminum perimeter rail 32A, 32B is included in a forward section of a cover framework to be described which supports an overlying stiff but resiliently bendable panel 34B without a fixed attachment to allow thermal expansion of the panel and to allow easy removal and replacement.

The perimeter rails, including the side perimeter rails 32A, 32B of the forward cover section 12, are formed with various features allowing interconnection with other framework members, a mounting of other components, as well as a support for the panel 34B.

Figure 11:
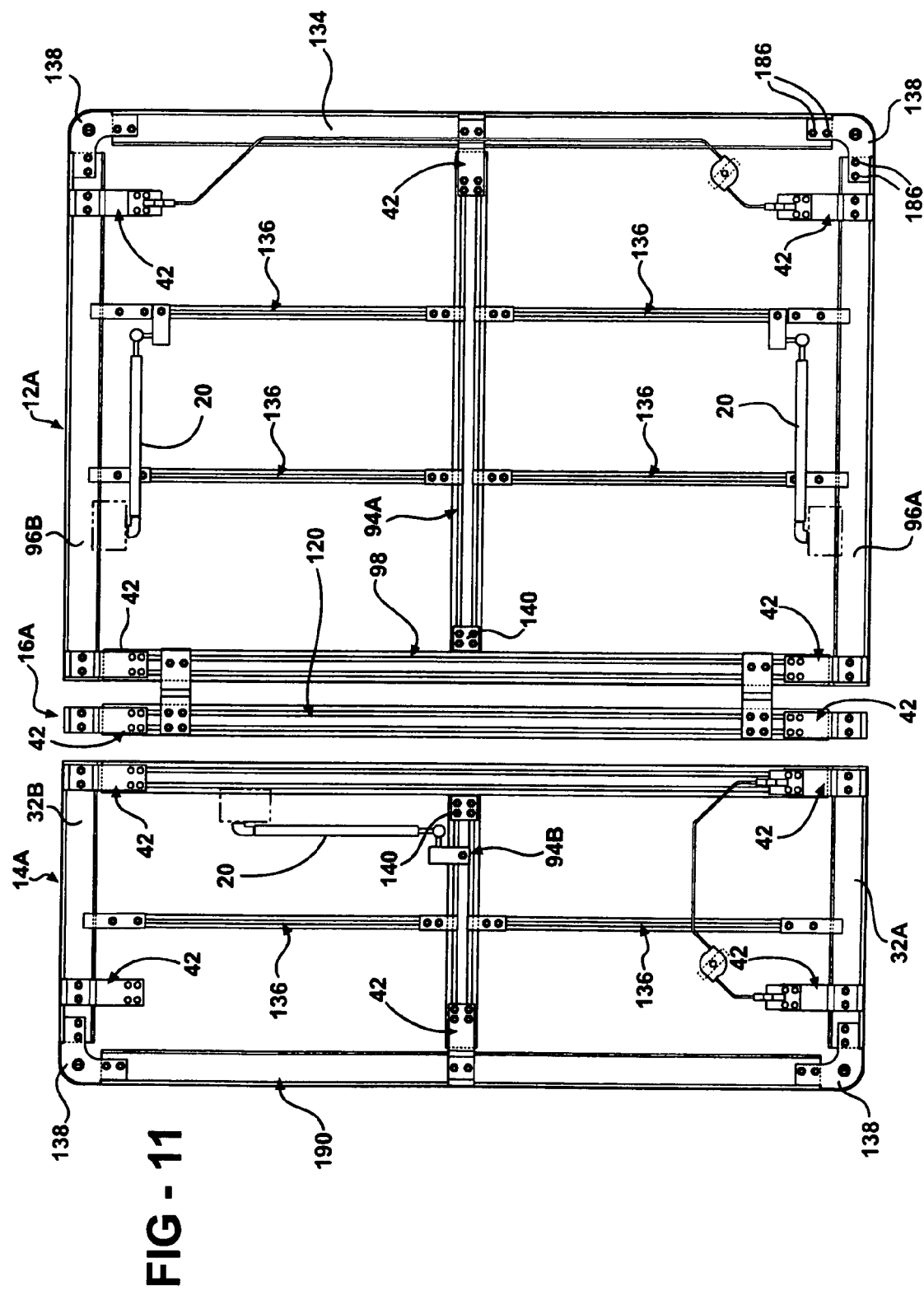
FIG. 11 is a plan view of a framework used in a three section hard tonneau cover according to the invention.

As seen in FIG. 11, two center crossing rails 94A, 94B and struts 136 are used to increase the weight sustainable by the cover. Additional crossing rails and/or struts could be added to increase this capability.

All of the perimeter rails 32A, 32B, 96A, 96B, 190, 134 of the cover framework (FIG. 11) are preferably of an identical section.

The perimeter rail features include an inwardly extending ledge 36 (FIG. 7) having an upper surface 38 on which an edge of the panel 34B rests, to be nonfixedly supported thereby. A tee slot 40 is formed underneath the panel supporting surface 38 configured to slidably receive a making feature formed on support-connector piece 42.

The support-connector piece 42 can be located at any desired location along the slot 40 and secured thereat with bolts 44 and nuts 46.

The connector-support pieces 42 may serve several purposes, i.e., to mount an upper hinge component 45 on the cover, to connect cargo box crossing rails 94A, 94B, 98 and 112 to a perimeter rail 190, 32A, 32B, 96A, 96B and 134 at the junction thereof, to mount latch assemblies and gas strut rod anchors to the framework. The connector-support pieces 42 have an extension 43 which can be angled down when used to mount other components to provide easier access to the fasteners.

Figure 8:
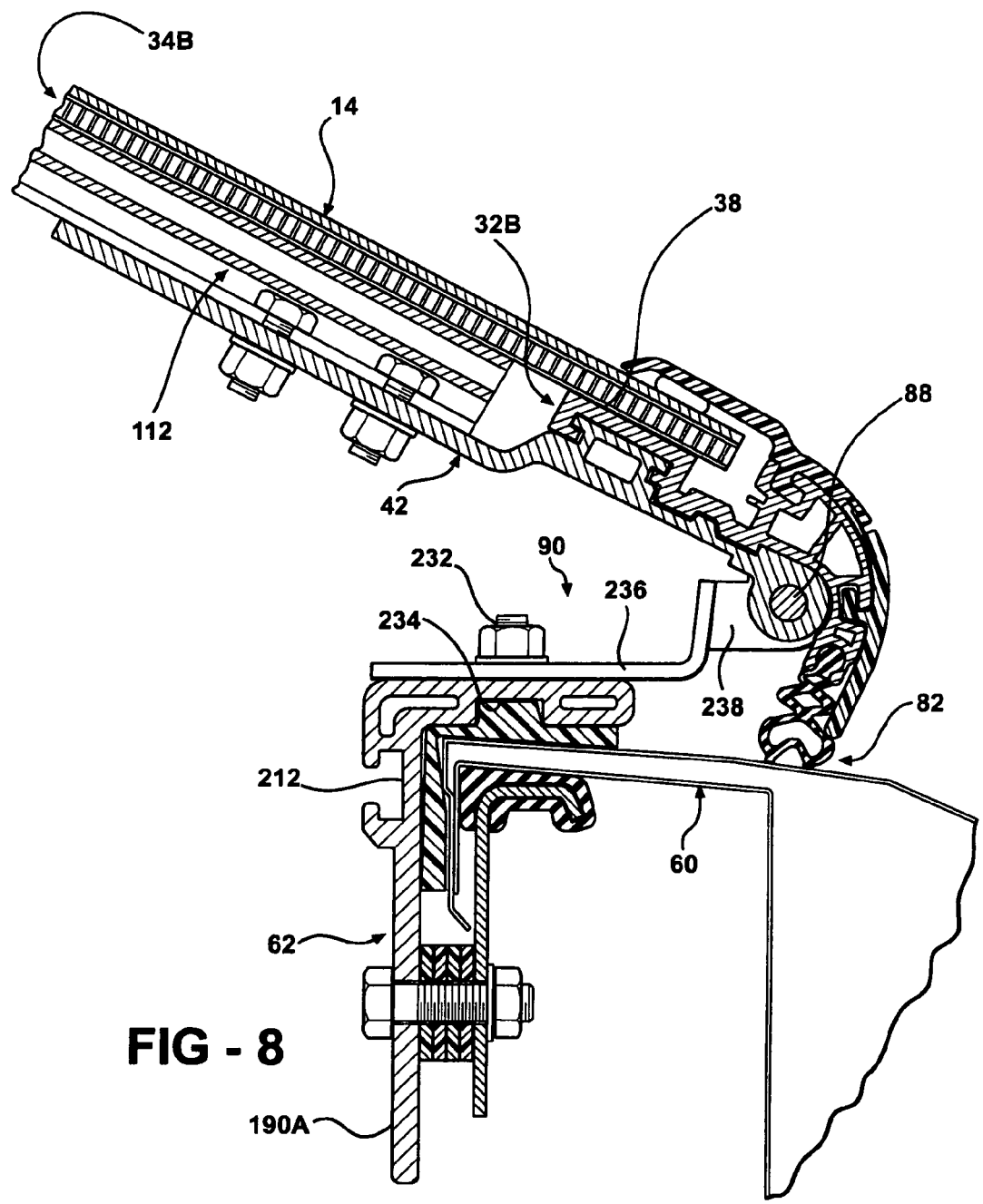
FIG. 8 is a sectional view of a rear portion of a raised cover section of the hard tonneau cover showing a hinge mounted on a universal clamp on bracket, and a connection of a crossing rail to a perimeter rail by a support connection bracket.

In FIG. 8, a latching assembly 48 is mounted at the free end of a support extension 43, operated by a cable 50 held on a bracket 52 also attached with bolts 54 and nuts 56.

The latching assembly 48 is engageable with a striker assembly 58 mounted to the lip of a cargo box structure 60 by a clamp on universal mounting bracket 62 described below in further detail.

The perimeter rails such as side rails 32A, 32B shown in FIG. 8, also include a curved outer surface 64 formed with L-slots 66, 68 receiving mating features on a pair of interfit plastic trim strips 70, 72 extending to overlie and cover the outer surface of the perimeter rails. The trim strips 70, 72 are preferably of molded plastic of a color matching or compatible with the vehicle to eliminate any painting of the perimeter rails 32A, 32B. The trim strips 70, 72 could be made in one piece, but making a separate upper strip 70 makes removal to release the panel 34B easier and quicker.

The trim strip 70 includes a forward section 74 extending over the rear side of the panel 34A with a down turned lip frictionally engaging the same.

The panel 34B is confined by the trim strips 70 but a clearance space at the edges allows thermal expansion to preclude any resulting distortion, and also allows ready replacement of the panel 34B.

An overlay film 76 can be loose installed overlying the panel 34B and likewise secured beneath the lip 72. The film 76 is constructed of a color integrated plastic of a matching color or compatible with the vehicle finish to eliminate the need to paint any of the panels 34A, B, C. Suitable weather resistant plastics are available for this application such as LEXAN™ and SLX™ by GE which can provide a class A, OEM compatible appearance in this installation.

Film 76 (typically 0.075-1.5 mm thick) can also be bonded to the panels 34A, B, C.

Each of the lower trim strips 72 extends below the bottom edge of the perimeter rail on which it is installed to complete the covering of the perimeter rails.

The perimeter rail sections including rails 32A, 32B have a partially circular groove 78 into which is fit a top bead 80 of a hollow, readily compressible elastomeric peripheral seal 82 partially concealed behind the lower part of trim strip 72, seal 82 engaging the sheet metal of the top of the cargo box wall, to exclude dirt and moisture. The seal 82 is designed to expand and twist as necessary to constantly maintain contact with the cargo box surfaces as the truck body flexes in negotiating a roadway, which contact eliminates surface wear which would otherwise occur by rubbing of the seal 82 thereagainst.

The cover 10 is supported spaced above the side walls of the cargo box 60 by the hinges, and strikers and latches, with the perimeter seal 82 extending about the entire cargo box perimeter, sealing the intervening space.

The seal 82 has hollow spaces 84 forming pleats creating the ready compressibility thereof as the associated section (12, 14) is tilted up about a hinge, as seen in FIG. 7.

FIG. 8 shows a side hinged cover section, (here shown as forward cover section 14). A connector-support piece 42 secured to the perimeter rail 32B is formed with a hinge pin receiving socket in which is inserted a quick release pin 88 which is received in a hinge clevis 89 formed on a hinge strap 90 attached to a second universal mounting bracket 62 clamped to the lip of the cargo box 60, described in further detail below. The strap 90 attaching bolts are not shown in FIG. 8.

Figure 12:
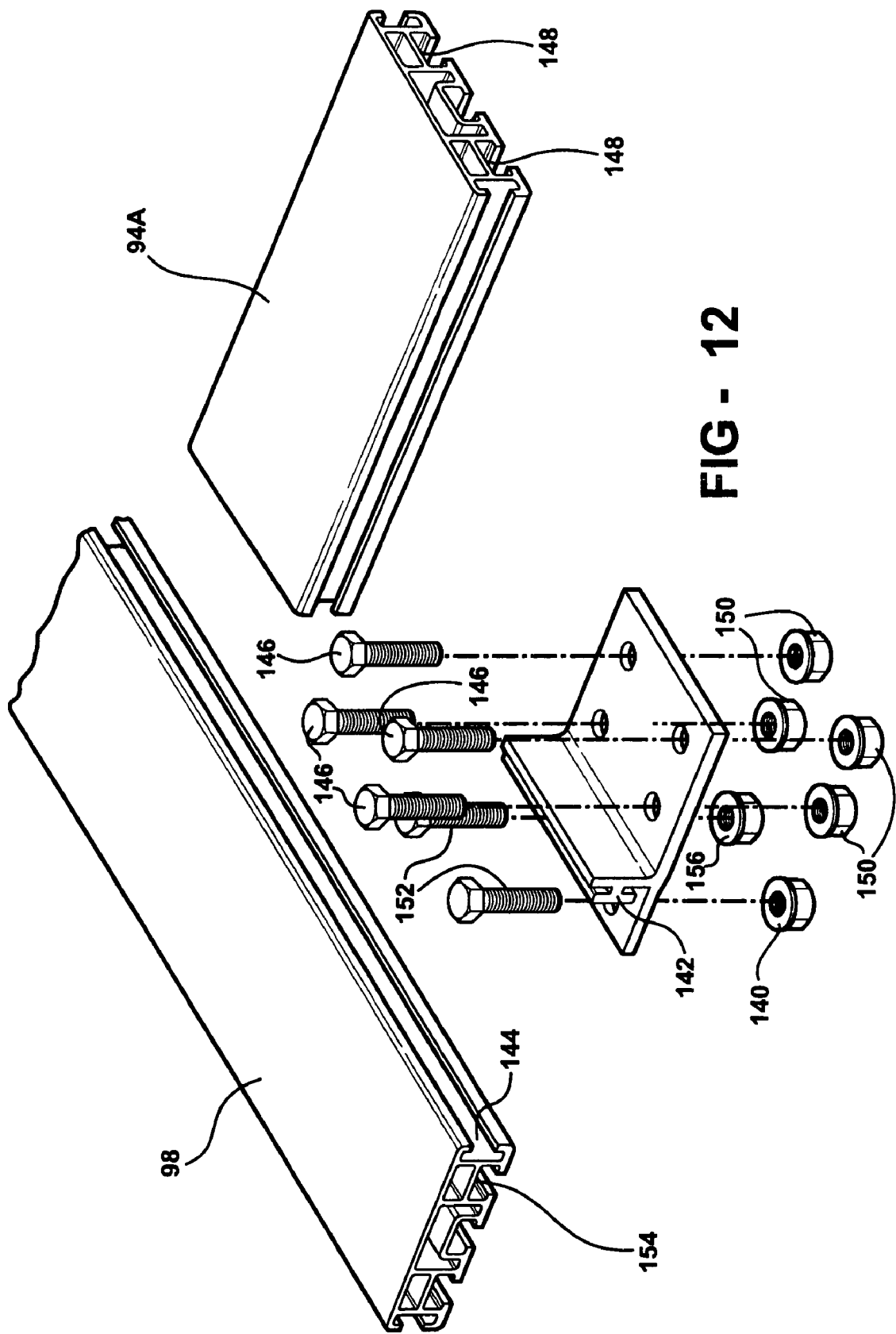
FIG. 12 is an exploded perspective fragmentary view of a connection between two main support rails included in the framework shown in FIG. 11.

The connector-support piece 42 is here also used to connect the perimeter rail 32B to one end of the cross rail 112 forming one end of the forward cover section 14 by a series of four bolts 86 having their heads received in downwardly facing tee slots in the crossing rail 112, similar to what is shown in FIG. 12 for crossing rails 98, 94. When used for this purpose, the connector-support piece extension 43 is angled to match the upward curving crossing rails 112.

Figure 9:
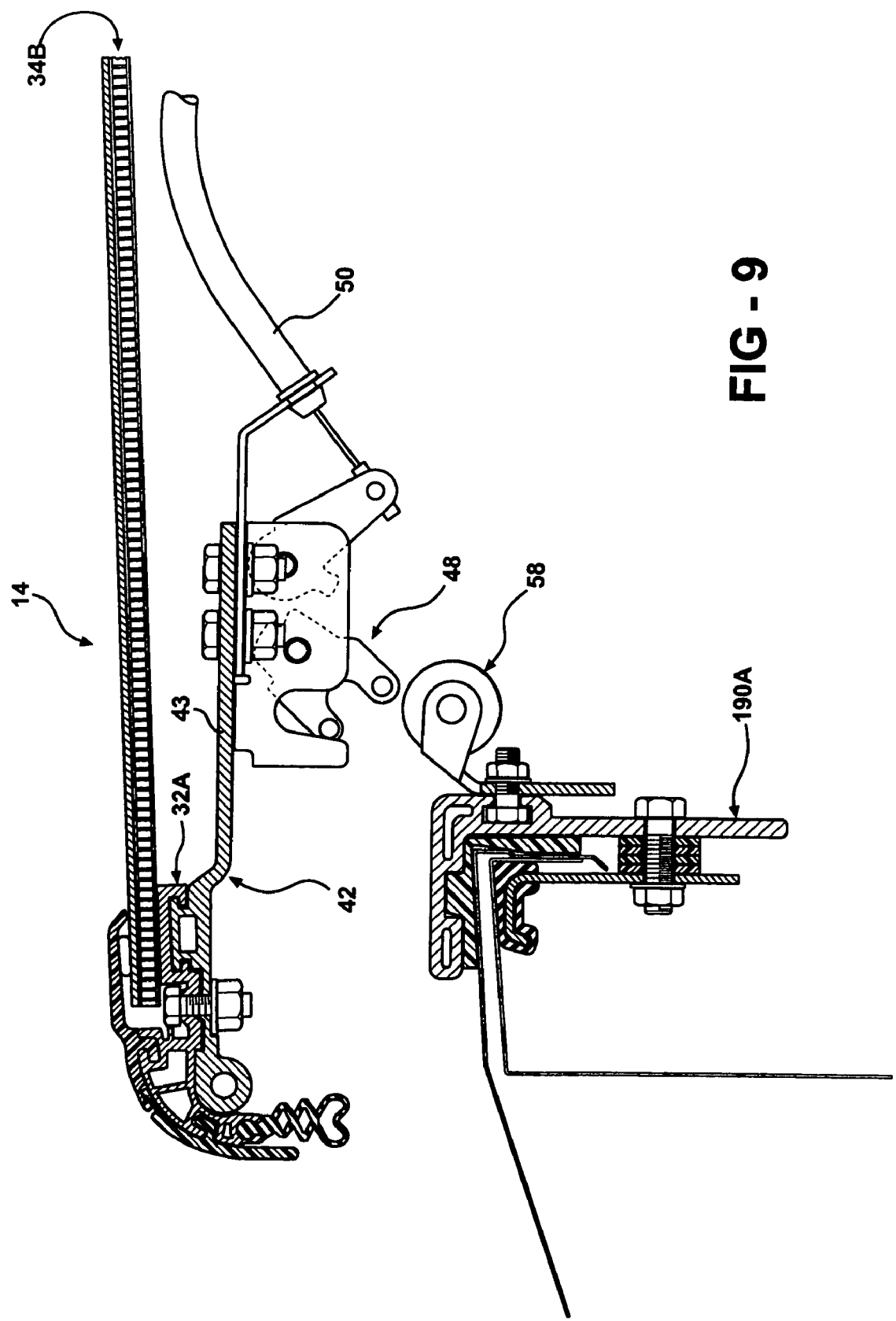
FIG. 9 is a sectional view of a rear portion of a cover section of the hard tonneau cover showing a striker on a universal mount disengaged with a latch mechanism on a cover section.

FIG. 9 shows a released latch assembly 48 and striker 58 mounted to a downwardly angled extension plate 43 of a connector-support piece 42, with the cover section 14 shown in a partially raised position. Removal of the cover section 14 is also readily accomplished by also removing the quick release hinge pins 88 on the other side wall, as will be described.

Figure 10:
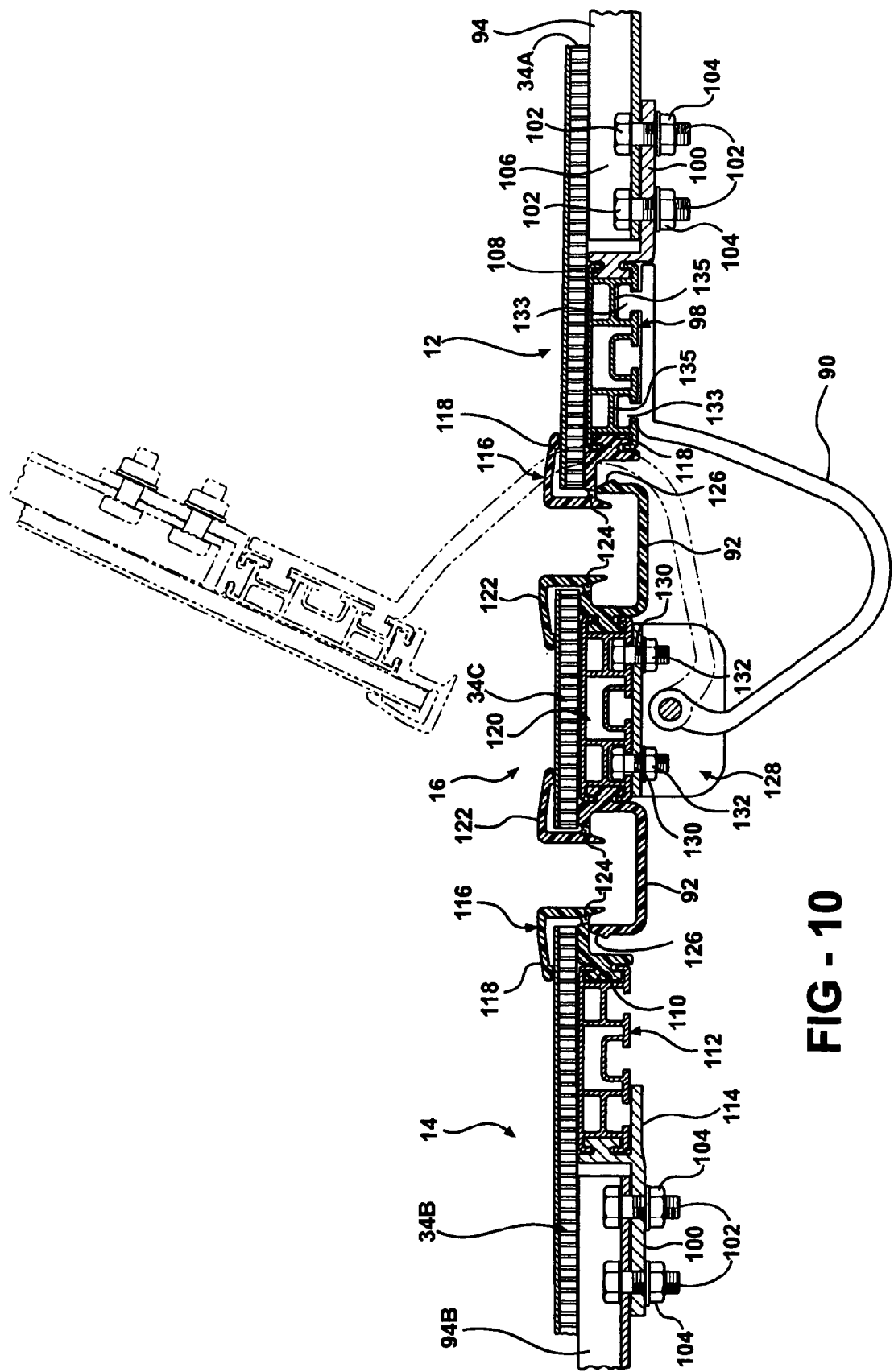
FIG. 10 is a view of the middle of a cross section taken through a three section hard tonneau cover according to the invention, with the rear cover section shown in phantom lines in a swung up position.

FIG. 10 shows a lengthwise section through adjacent portions of the forward cover section 14 and the rear cover section 12, and the fixed center section 16.

The rear cover section 12 and forward cover section 14 are both spaced from the fixed center section 16, and trim-gutter pieces 92 are installed to bridge the gap therebetween.

The rear cover section 12 includes the center crossing rail 94A, preferably an aluminum extrusion, running lengthwise down the center of the framework 12A (FIG. 11) connected to a similarly shaped end crossing rail 98 by means of a bridge piece 100 connected by bolts 102 received in a tee slot 106 of the main support rail 94, and nuts 104.

As shown, the bridge piece 100 has a horizontally projecting tee head feature 108 slid into a corresponding tee slot of the rail 98.

The front cover section 14 also includes a center crossing rail 94B connected to a similarly shaped perimeter rail 112 with a bridging piece 114 joined in a similar manner as the rear cover section 12.

A trim strip 116 is mounted in a tee slot 110 extending along each crossing rail 98, 112.

Each trim strip 116 has an upper lip 118 which overlies an associated panel 34B or 34A to nonfixedly secure the same in position atop a respective rail 98, 112 (together with the outer perimeter trim strips 70).

The fixed center cover section 16 similarly includes a crossing rail 120 identical in configuration to rails 98 and 112 which is fixed to the cargo box side walls with a connector-mounting bracket (not shown) as is used to mount the striker and hinge components to the cargo box.

The gutter pieces 92 have an integral trim strip portion 122 capturing a narrow width panel 34C of the same construction as the panels 34A and B.

Water drainage holes 124 in each of the strips 116 and 122 allow water to pass into gutters 92. A stiffer durometer plastic is used for the gutter portions than the strip portions 122.

A terminal edge 126 is urged into engagement with an understep of the trim strips 116 just beyond the drain holes 124 to insure that any draining water is captured.

The hinge straps 90 are pivoted to a bracket 128 secured to crossing rail 120 by bolts 130 having their heads captured in a tee slot in the underside of the rail 120, with nuts 132 on the bolt ends protruding through the bottom plate thereof.

The hinge straps 90 are secured at their opposite end by interfit tee features 133 and slots 135 in rail 98. Bolt and nut sets are used to locate the straps 90 at any selected position along the rails 98, 120.

FIG. 11 shows the complete framework for a three section tonneau cover, providing support for the panels 34A, 34B, 34C, including framework sections 12A, 14A and 16A.

Rear section framework 12A includes the pair of side perimeter rails 96A, 96B, the forward end crossing rail 98 and the rear end perimeter rail 134 connected together at their meeting ends to form the rectangular framework 12A.

The center crossing rail 94A extends lengthwise between the rear end perimeter rail 134 and the crossing rail 98, which is directly connected at its ends to the midpoint of each of those rails.

The rear end of center crossing rail 94A is connected to the rear and perimeter rail 134 using a connector support piece 42 as described above.

A series of smaller width strut rails 136 are connected to the side perimeter rails 96A, B to provide additional support for the panel 34A. The rear perimeter rail 134 is connected at its ends to a respective rear end of a side perimeter rail 96A, B by a pair of connector pieces 138. More crossing rails and struts could be added to increase the weight carrying capacity of the top.

FIG. 12 shows a connection between end crossing rails 112 and 98 to a central crossing rail 94A, 94B by a connector plate 140, having a tee feature 142 slidably received in a side facing tee slot 144. The heads of a series of bolts 146 are slidably captured in parallel slots 148 of rail 94A or B and attached to connector plate 140 when nuts 150 are installed.

A pair of bolts 152 enter slot 154 of rail 98 and are secured with nuts. Thus, the rails 94A, 98 can be slidably positioned anywhere along the slots 154 but are securely fixed in any selected position. The rails 94A, 98 can be trimmed to any size adapted to a particular truck configuration as well as being locatable anywhere along the length of a connected rail to provide great adaptability to various truck bodies.

Figure 13:
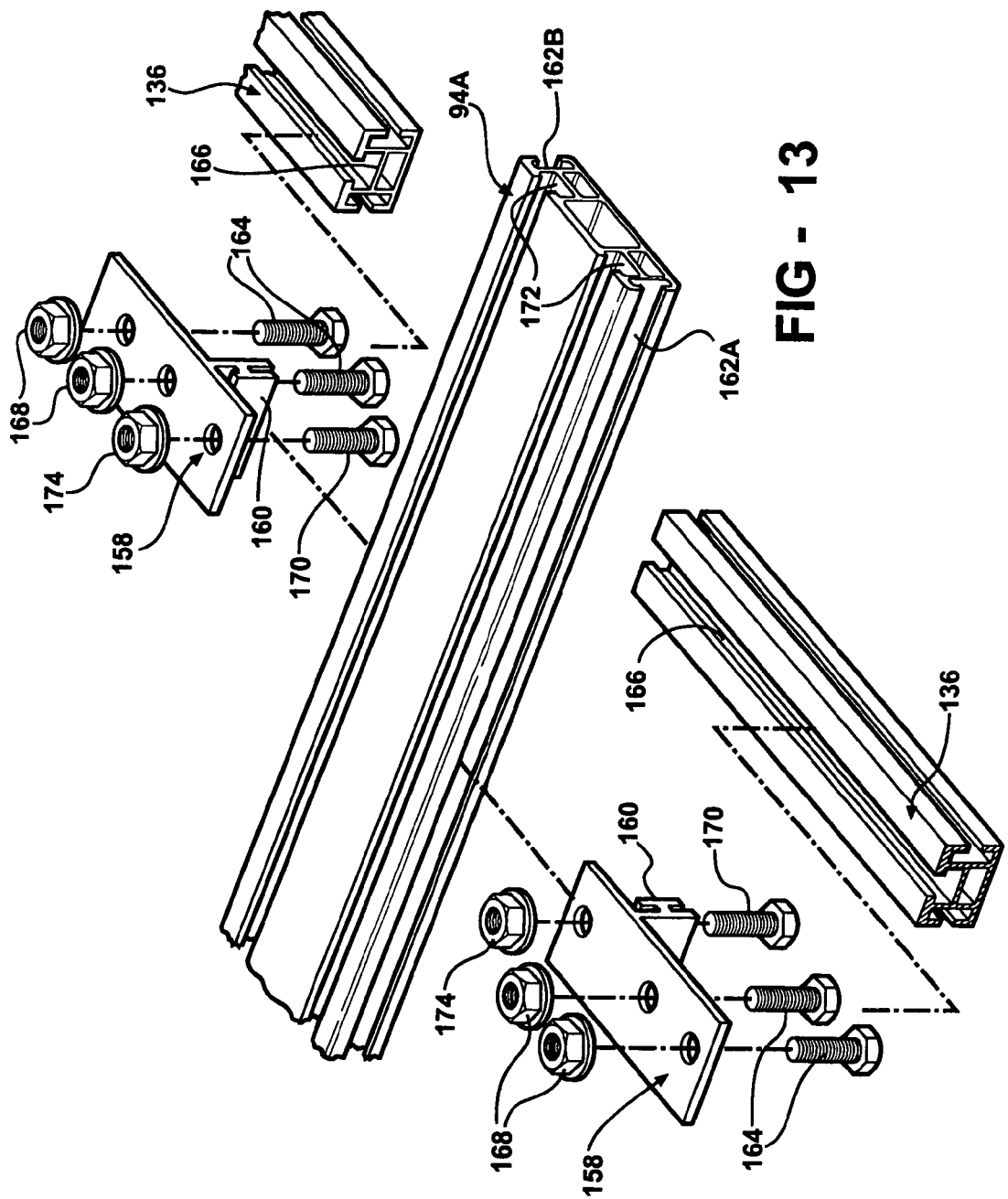
FIG. 13 is an exploded perspective fragmentary view of a connection between a strut rail and a central crossing rail included in the framework shown in FIG. 11.

FIG. 13 shows the typical connection of strut rails 136 to central crossing rail 94A.

Small connector plates 158 each have a tee feature 160 slidably captured in a side facing slot 162A or B on the rail 94.

Bolts 164 have their heads slidable in a slot 166 in the top of rails 136 with nuts 168.

Bolt heads are also preinstalled in top slots 122 of the rail 94A and secured with nuts to secure the rails 136 in any adjusted position.

Figure 16:
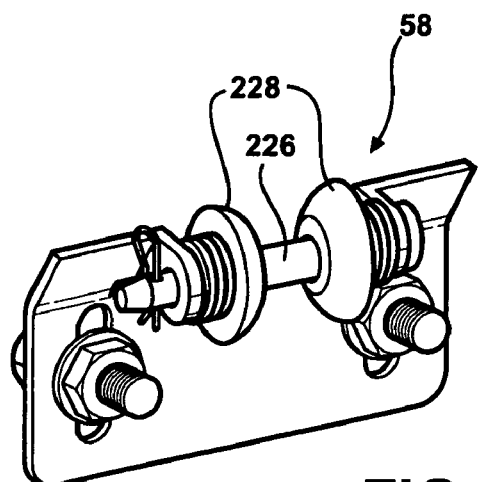
FIG. 16 is a pictorial view of the striker assembly shown in FIGS. 14 and 15.
Figure 17:
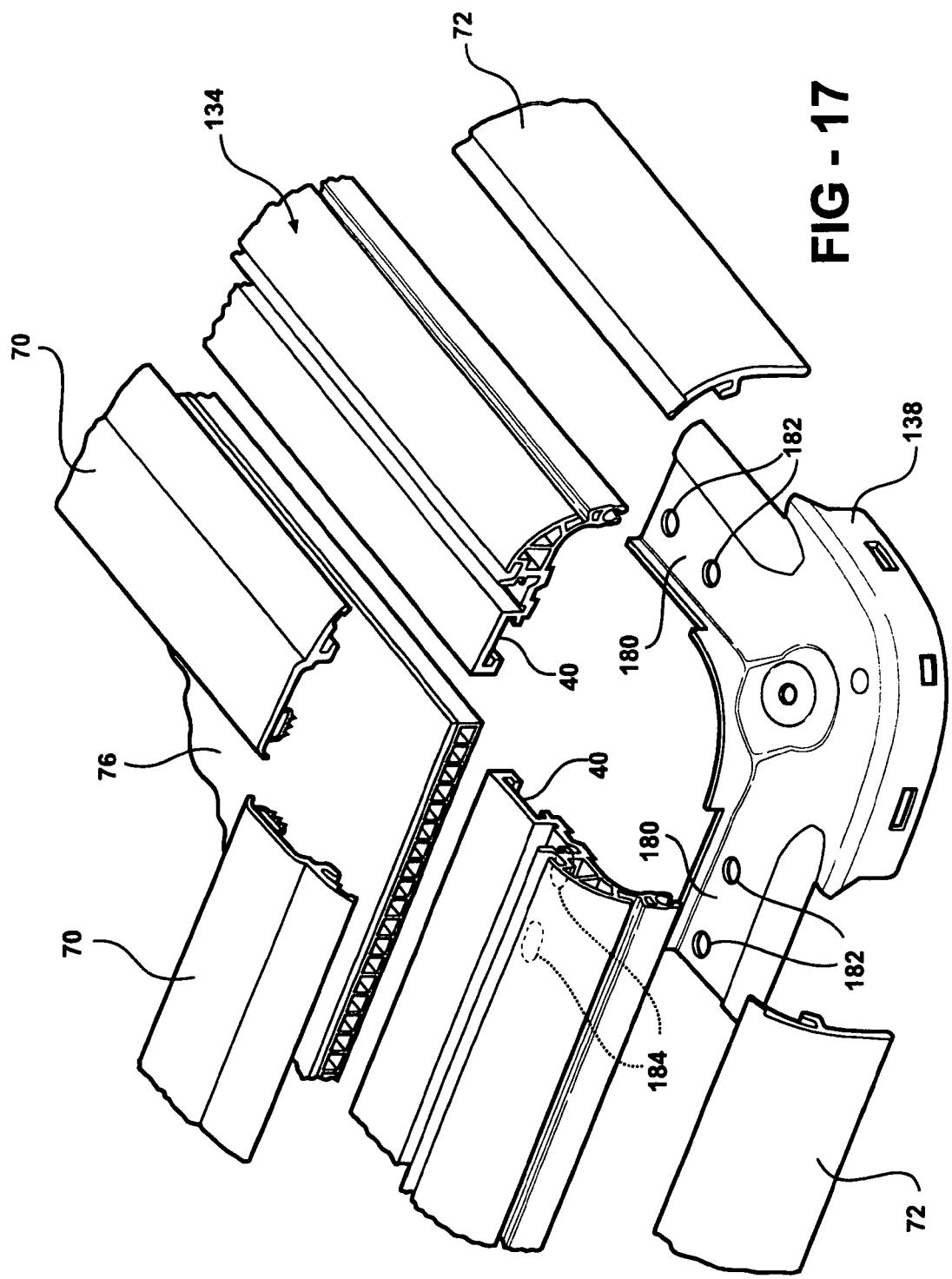
FIG. 17 is a fragmentary exploded view of tonneau cover components at one corner.

These connections are typical of the rail connections in framework 12A, 16A. Crossing rail 120 is connected to the truck cargo box structure by a hinge connection included in a connector support piece 42 at each end thereof. Corner connector pieces 138 (also shown in FIG. 16) have contoured ends 180 fit beneath respective ends of rails 96B, 134 with bolt holes 182 aligned with holes 184 in the rails to allow installation of pairs of bolts 186 to secure the corner pieces 138.

Forward framework section 14A also includes connector plate pieces 138 and a perimeter end rail 190 with strut rails 136. The lengthwise crossing-rail 94B is connected at one end to the forward perimeter rail 190 with a connector-support piece 42, and to crossing rail 112 with a connection as shown in FIG. 12.

The members of framework sections 12A, 14A, 16A are covered by plastic trim including the trim strips 70, 72 described above, the trim strips 70, 72 used on each of the perimeter rails 190, 134, 32A, 32B, 96B, 96B.

It is noted that each of the crossing rails 94A, 94B, 112, 120, 198 are purposely bowed during the extrusion process to provide a crowning of the panels 34A, B, C towards the sides and the front and rear of the cover 10 in order to shed water. For this reason, the ledge surfaces 38 of the support-connector pieces 42 may be tipped slightly upwardly to be aligned with the ends of the curved crossing rails.

Figure 14:
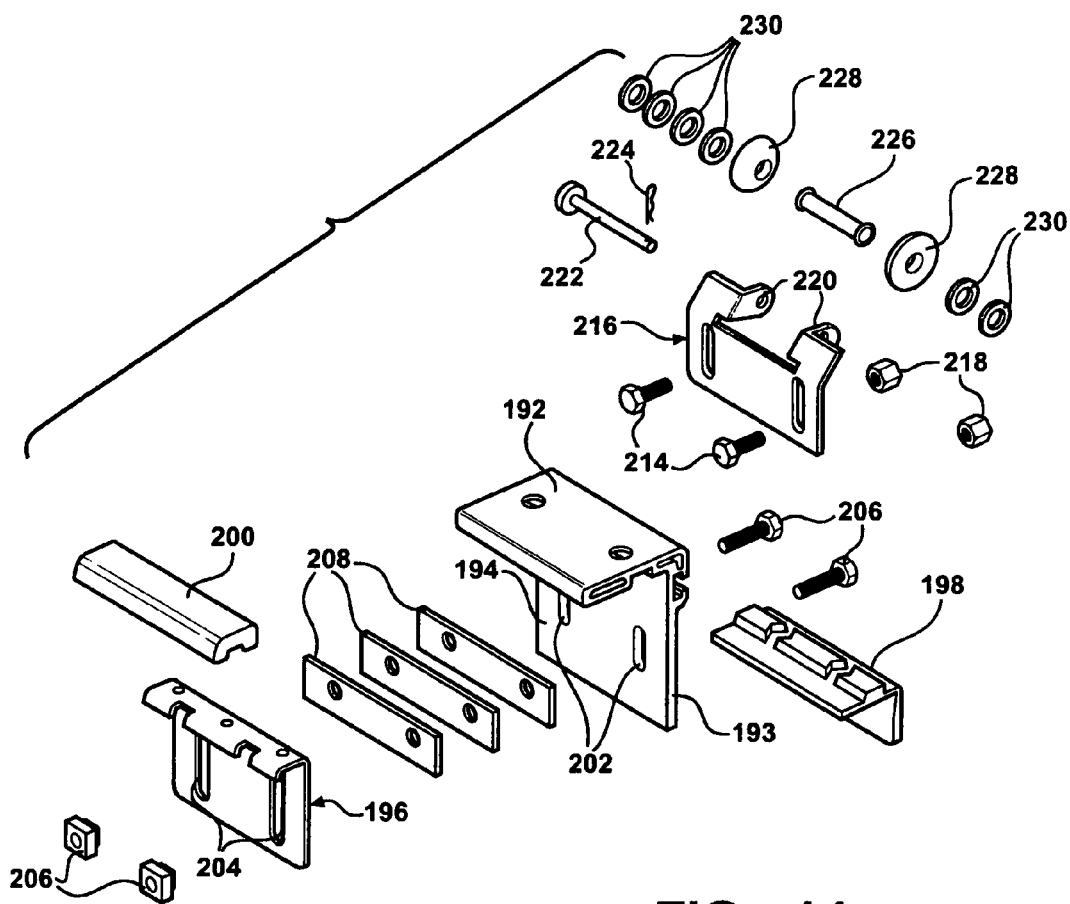
FIG. 14 is an exploded pictorial view of a universal clamp on bracket and a striker assembly components mounted thereto.
Figure 15:
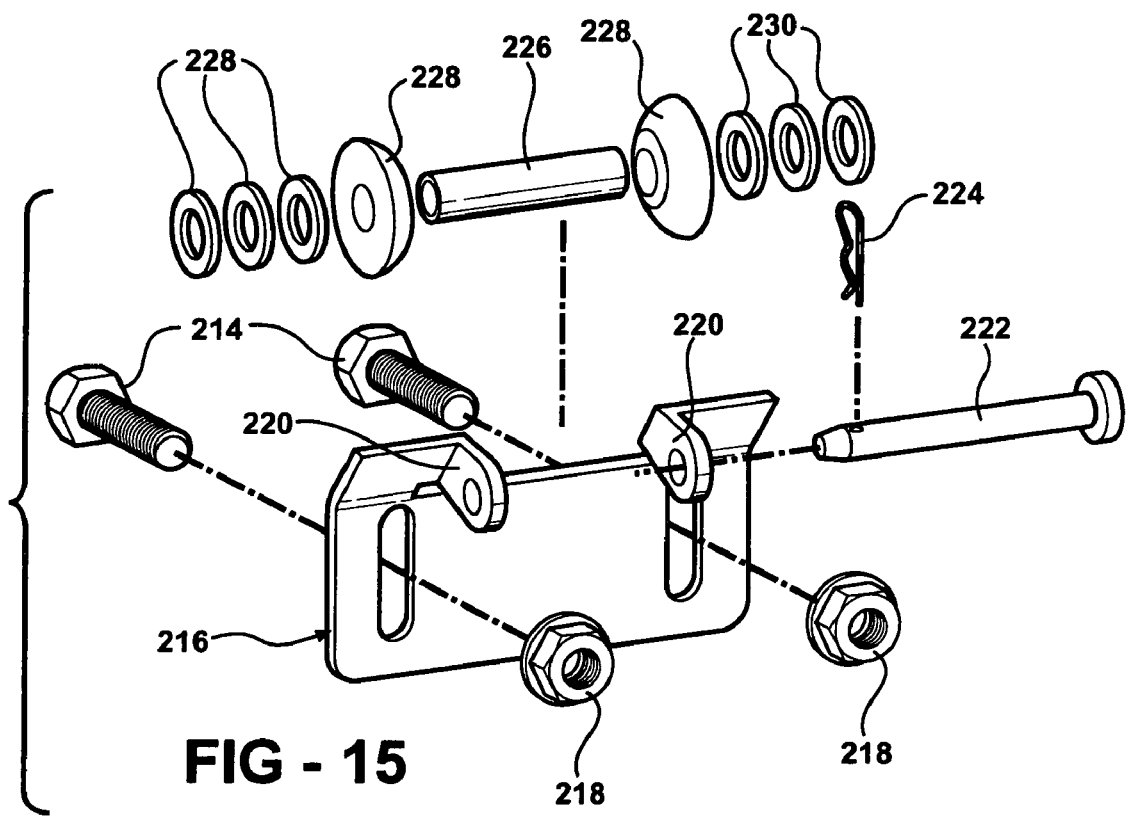
FIG. 15 is an enlarged reverse exploded pictorial view of the striker assembly components shown in FIG. 14.

The universal clamping bracket 62 is shown with a mounted striker assembly 58 in FIGS. 7 and 14. A main clamping angle 193 has an upper leg 192 extending across the top of the cargo box side wall 60 and a vertically descending lower leg 194 extending alongside the downturned cargo box lip 61.

An inner clamping angle 196 is arranged on the inside of the cargo box lip 61, with interposed cushioning members 198, 200 attached to respective clamping angles 190, 196.

Each clamping angle 193, 196 has a pair of slots 202, 204, aligned with each other to allow insertion of a pair of bolts 206 to be secured with cage nuts 206. The slots 202 allow vertical adjustment of a hinge, striker or gas strut anchor as needed.

A series of three spacer strips 208 having holes 210 to receive the bolts 206. The mounting bracket 62 can thus be mounted vertically to a wide variety of shapes of cargo box side walls 60.

A tee slot 212 is formed on the inside of the vertical portion of the vertical leg 194 of the clamping angle 193.

The heads of a pair of bolts 214 are received in the tee slot 212 and pass through slots in a striker bracket 216, secured with nuts 218.

A pair of ears 220 have aligned holes which receive a quick release pin 232 secured with a colter clip 224.

A stainless steel sleeve is installed over the hardened steel pin 222 and confined beneath guide washers 228 and a series of spacer washers 230. Removing or switching sides of the spacer washers 230 allows adjustment of the axial location of the gap between the guide washers 228 to proper function with the latching assembly 48.

The stainless steel tube 226 rotates against the rotary latch pawls to reduce and even the wear thereon as the truck is driven, and resists corrosion.

The universal clamping bracket 62 can also be used to connect a hinge bracket 90 as shown in FIG. 7, allowing a fixed or hinged connection of a perimeter rail 134, 96A, 96B, 32A, 32B or 190 with an end of a crossing rail 94A, 94B, 112, 98 or center rail 120 directly to the cargo box side wall 60 at any location along the rails or side wall to readily adapt the tonneau cover to a wide variety of cargo box configurations.

In this case, the heads of a pair of bolts 222 (FIG. 26) are received in a slot 234 to pass through holes in the upper leg of the clamping angle 193 and through a hinge mounting strap 236 secured with nuts 240 mounting a removable hinge pin 88 between ears 238.

By providing a hinge connection on opposite sides of the center rail 120, the hinge connection fixes the cover section 16 to the cargo box 60.

Figure 24:
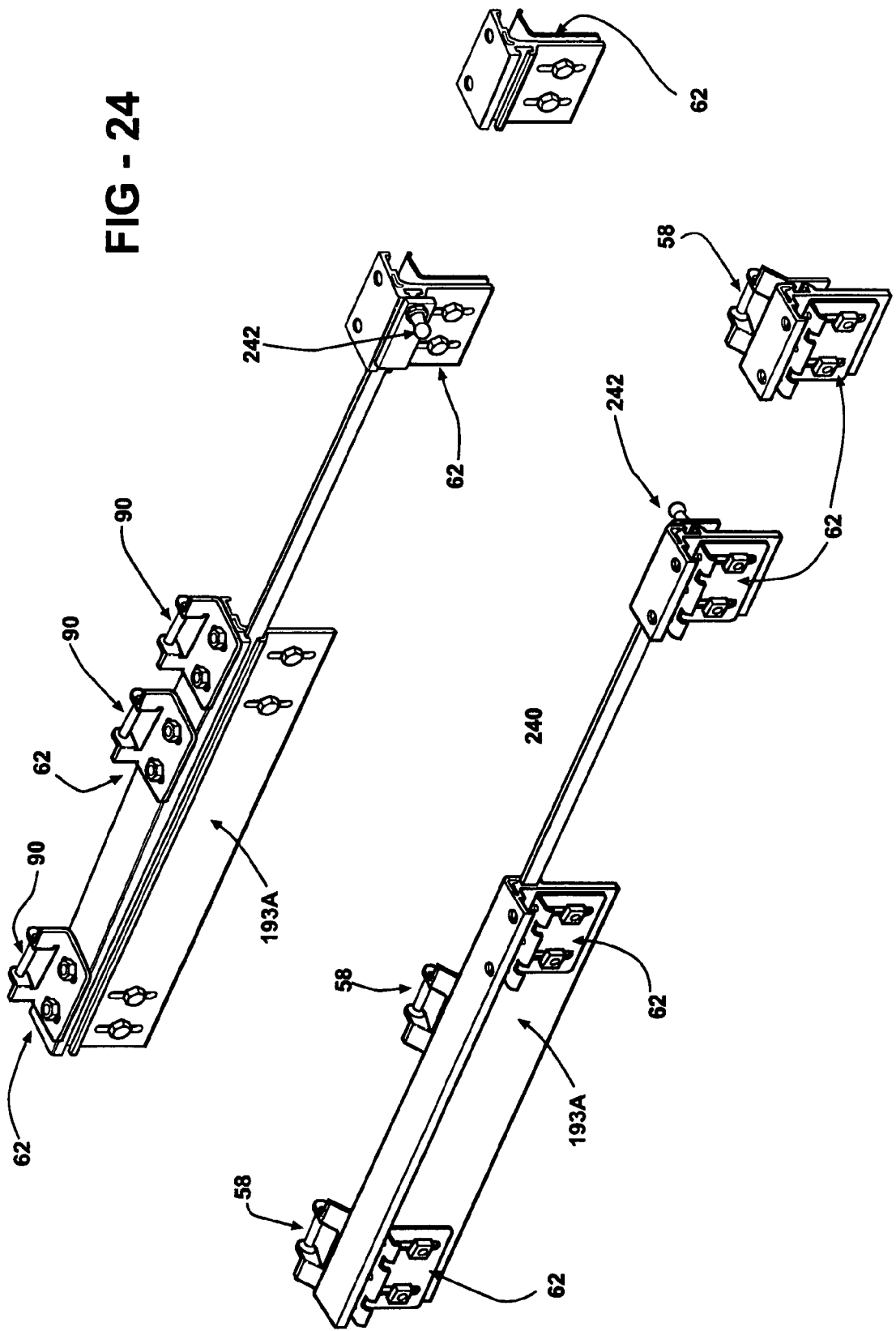
FIG. 24 is a pictorial view of the cargo box brackets used to mount the tonneau cover to the cargo box.
Figure 25:
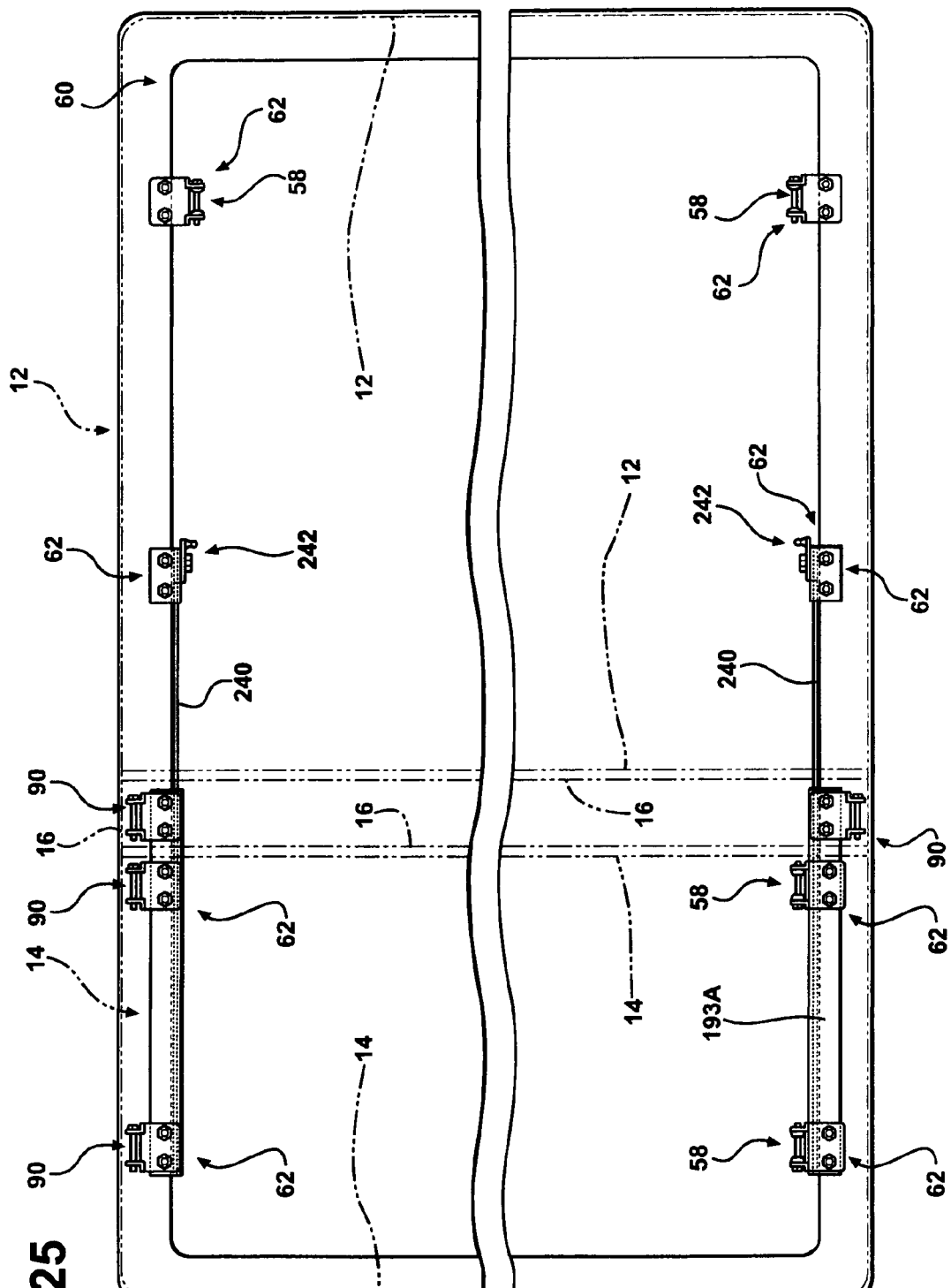
FIG. 25 is a plan view of the brackets and components shown in FIG. 24 with a representation of the cargo box perimeter.

FIGS. 24 and 25 show an example of the cargo box mounting system components for a three section system as shown in FIG. 1.

The forward cover section 14 is mounted to the cargo box 60 using an extended length main clamping angle 193A forming a combined universal clamping brackets 62 on each side which each mounts a striker assembly 58 on one side and hinge brackets 90 on the other side of the cargo box area to receive the forward cover section 14.

Each extended length angle 193A extends further to allow mounting of another hinge bracket 90 on each side of the cargo box to mount the fixed center cover section 16.

This arrangement creates a secure connection of the entire tonneau cover to the cargo box 60 to create a stable support for all of the components of the cover 10.

A gas strut support 242 is provided by a separate clamping bracket 62 on each side which is stabilized by an extension piece 240 secured to the extended bracket 193A.

A pair of striker assemblies 58 are mounted using mounting brackets 62 at the rear of the cargo box area which is to receive the rear cover section 12.

FIG. 11 shows partial portions of a pair of gas struts 242 anchored at one end to a bracket 244 secured to strut rails 136.

A single gas strut 246 is connected at one end to a bracket 248 installed on one side of the rail 112, the other end to a bracket 250 mounted by bolts received in the inside facing tee slot of the extended length angle 143A.

A pair of lock assemblies 252 are mounted to a cover panel 34 and each have a pair of cables 50 leading to latch assemblies 48.

According to the tonneau cover of the present invention, the various rails are covered with molded plastic trim including the strips 70, 72 installed on all of the perimeter rails 32A, 32B, 96A, 96B, 190 and 134.

Figure 20:
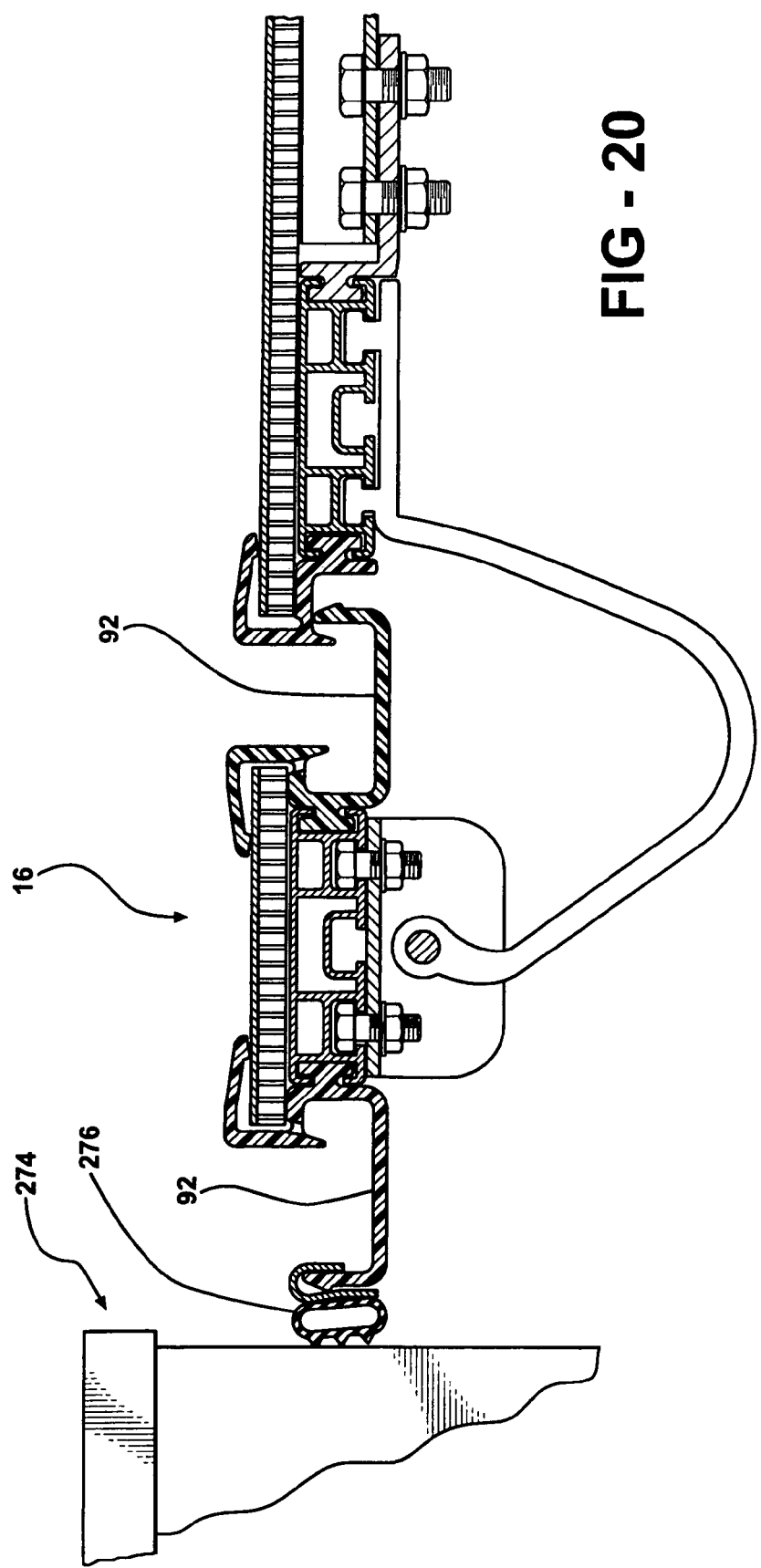
FIG. 20 is an enlarged fragmented cross sectional view through the hard tonneau cover combined with a tool box shown in FIG. 5.
Figure 21:
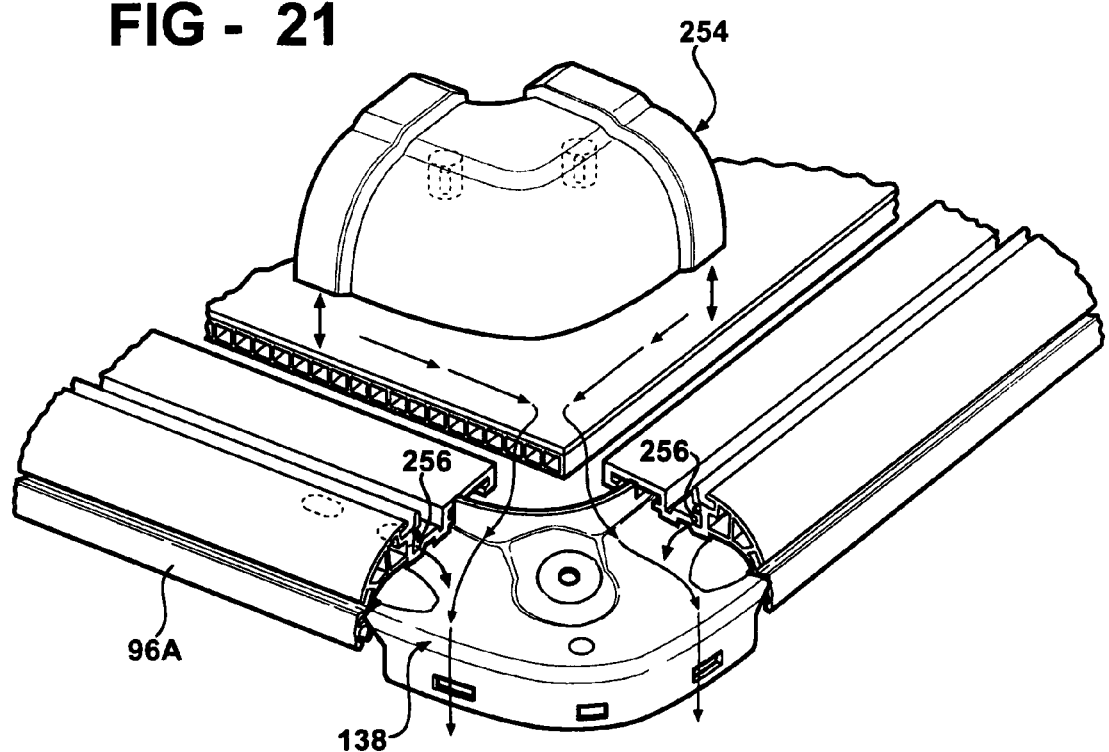
FIG. 21 is a partially exploded pictorial view of one corner of a tonneau cover according to the invention showing a water drainage path by a series of arrows.

In addition, trim corners 254 which are fit between the ends of trim strips 70, 22, secured with upwardly extending screws passing through the connector pieces 138 (FIG. 20). The corners 254 also prevent the trim strips 70, 72 from shifting out of position. Removal of the corners allows easy removal of strips 70 for replacement of the panels 34.

Water seepage which passes by the panel seals 74 is collected in a channel feature 256 in each of the perimeter rails 96A, 96B, 32A, 32B which flows out over the corner pieces 138 and over the outer edge. This also happens to water on the panels 34A, B, C seeping under the trim strips. The drain path lies outboard of the peripheral seal 82 (FIG. 2) to insure that no water enters the cargo box 60.

Figure 18:
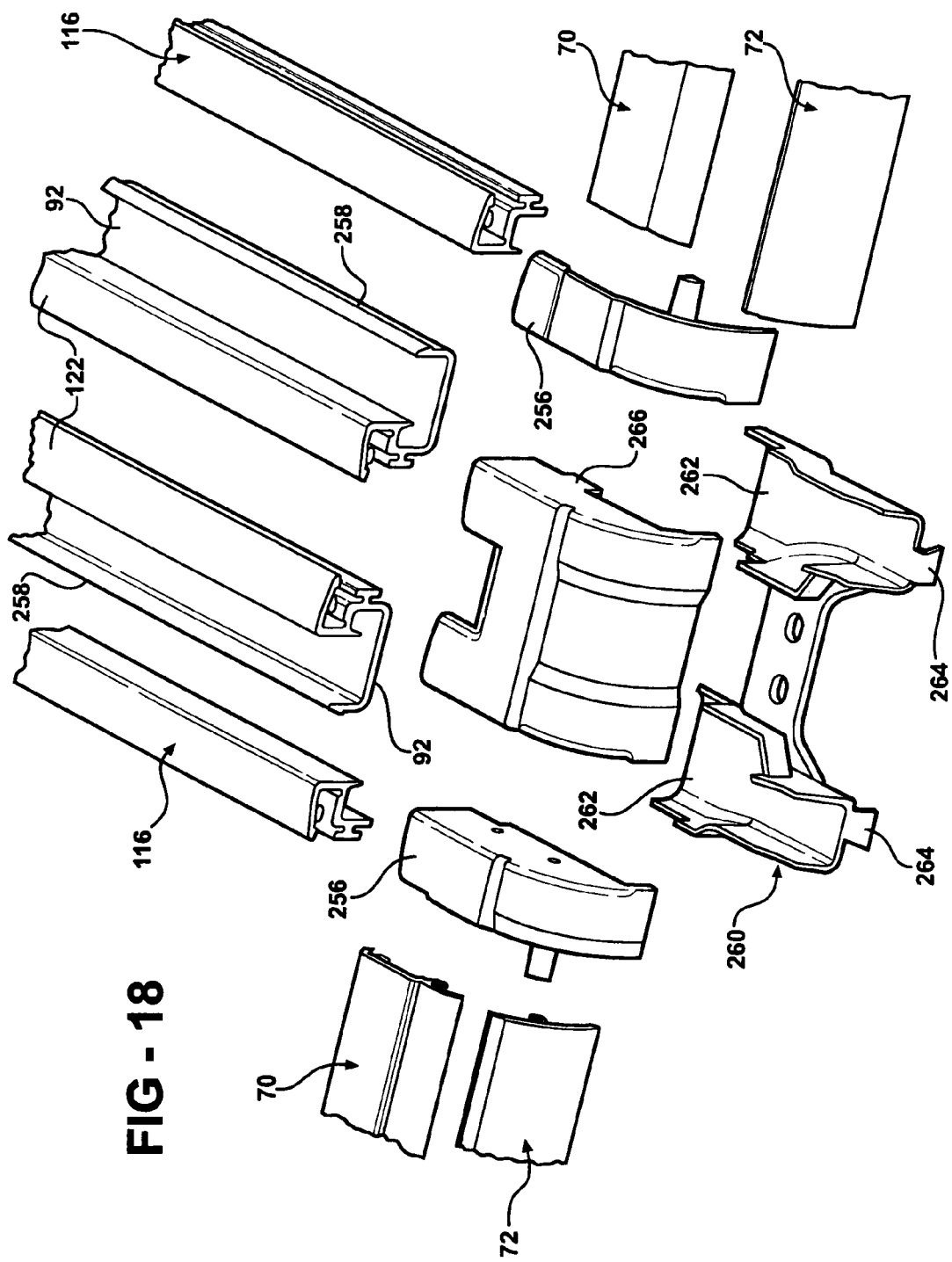
FIG. 18 is a fragmentary exploded pictorial view of trim components included at the junction of the front, center, rear cover section of a three section tonneau cover according to the invention.
Figure 19:
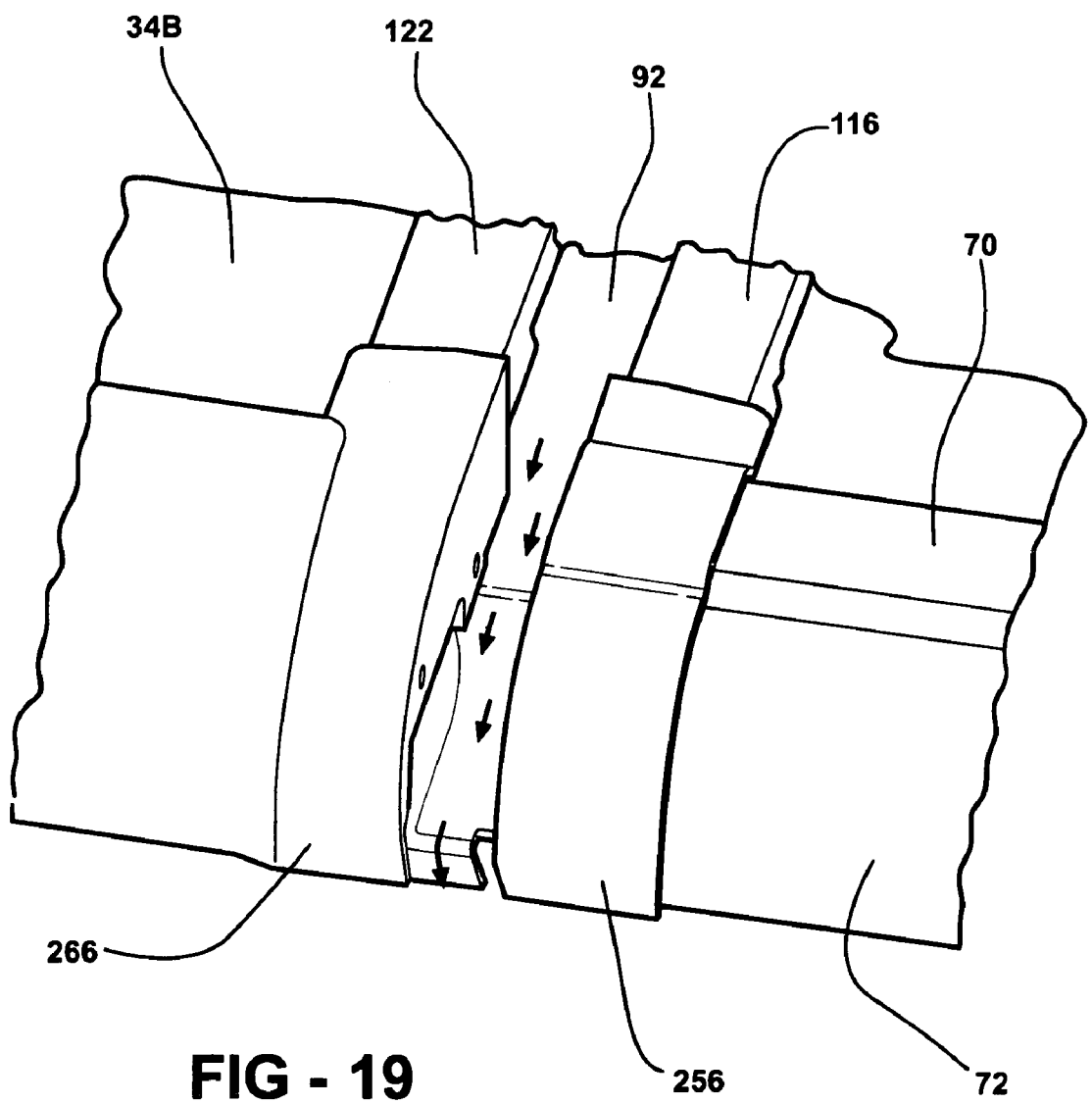
FIG. 19 is a fragmentary assembled view of portions of the components shown in FIG. 18 with a water drainage path indicated by a series of arrows.

FIGS. 18 and 19 show the trim components associated with the center section 16 and the adjacent sides of cover sections 12, 14 on one side of the cover, the opposite side having the same components.

A pair of end pieces 256 are each fit to one end of a perimeter rail 96A, 32A (not shown in FIG. 18), overlapping the trim strips 70, 72, to one side and 116 at the top as well as the outside side wall of the trim gutter 92 aligned therewith.

A collector tray or cup 260 has two channel features which each slidably receive a respective gutter 92 so that draining water is guided to drip edges 26.

A cover 266 is fit atop the collector tray 260.

The perimeter skirt seal 82 (FIG. 29) extends around the perimeter, installed in the perimeter rails and corner pieces.

Figure 29:
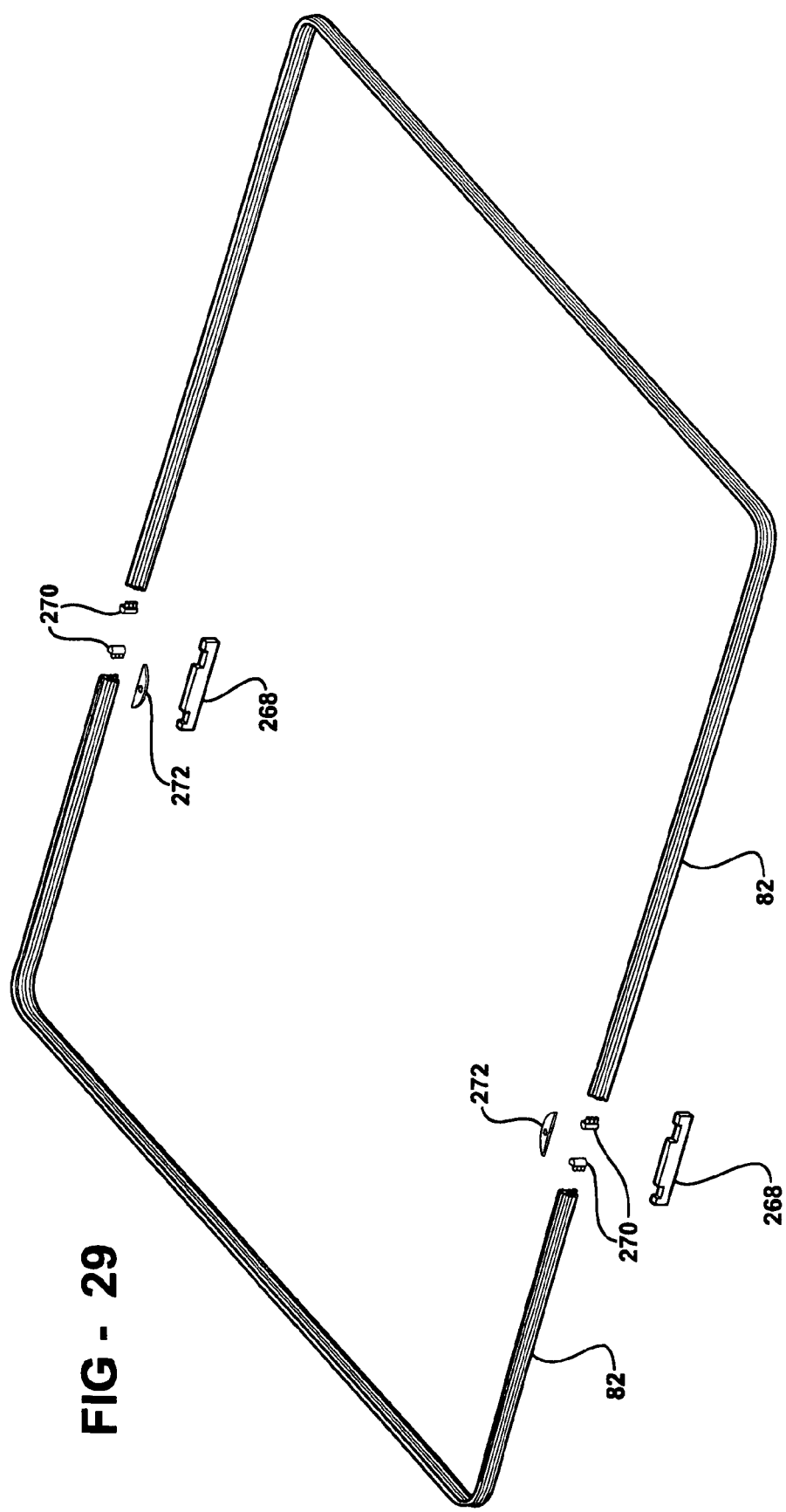
FIG. 29 is a pictorial view of the peripheral seal and auxiliary seal and components incorporated in the tonneau cover according to the invention.

As shown in FIG. 29, in the region of the center section 16, short seal connector sections 268 each are positioned at one end of the center rail 120 by plugs 271 inserted in the seal hollows of the ends of the peripheral seal 82. Plugs 271 are compressed against the ends of the seal section 268 to accommodate movement of the sections 12, 14 while inserting seal continuity when the sections 12, 14 are closed to finish the complete coverage. A diverter strip 272 funnels water onto cup 260.

That is, the seal sections 268 bridge the gap between the ends of the peripheral seal 82 held in the perimeter rails.

FIG. 20 shows an installation with a tool box 274. In this case, the fixed center section 16 still has two gutters 92 attached, but the rearmost gutter has a butt seal 276 clipped to the rear gutter wall to bear up against the side of the tool box 274 to create a water seal.

Figure 23:
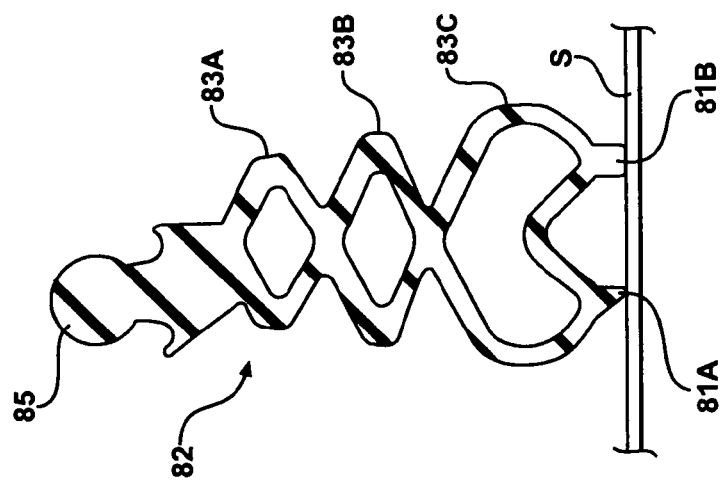
FIG. 23 is an enlarged sectional view of the full peripheral seal included in the hard tonneau cover according to the invention.
Figure 22:
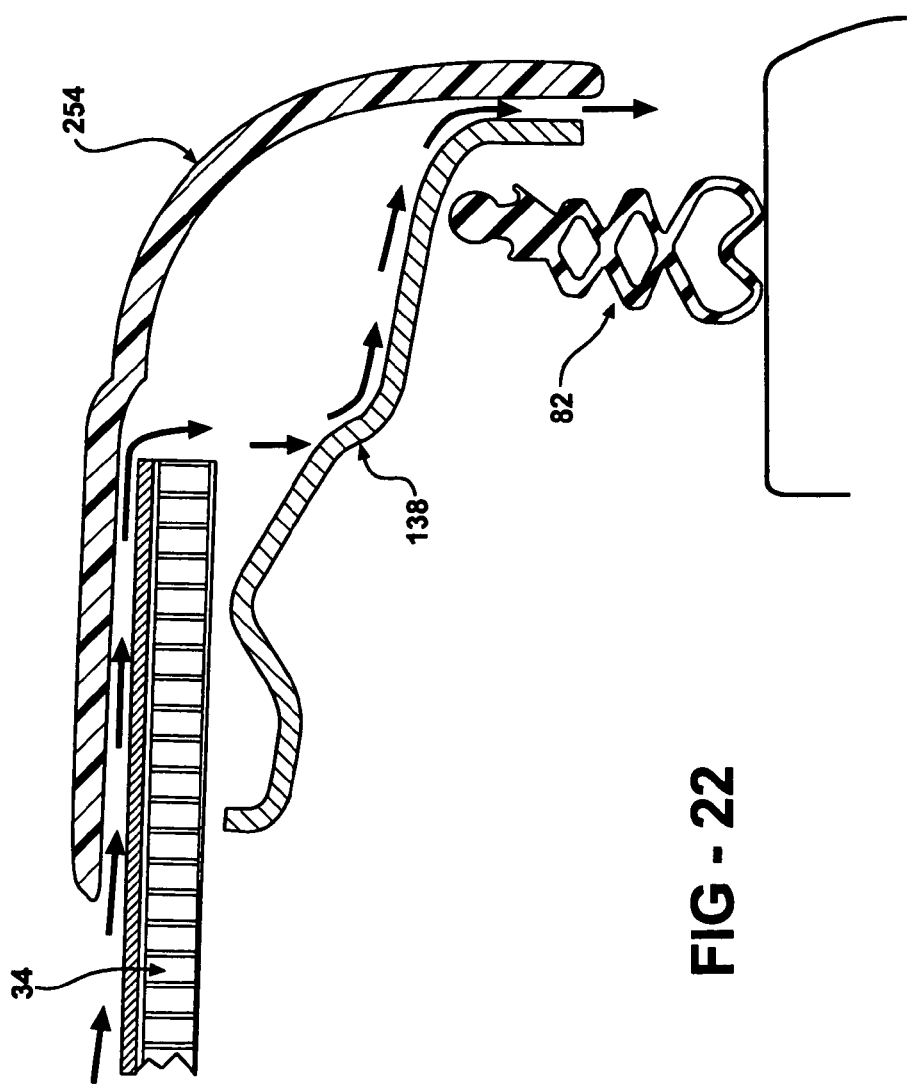
FIG. 22 is a fragmentary view of some of the hard tonneau cover components at the rear edge showing a water drainage path by a series of arrows.

FIG. 23 show a preferred shape of the seal 82 in which a series of successively layered hollow accordion pleats 83A, B, C extend from a mounting rib 85. These accommodate considerable compression and tilting of the seal 82. The bottom of the pleat 83C has a pair of spaced apart ribs 81 to engage and seal against surface 85. This shape minimizes trapping of dirt which can scratch the surface 85 if a seal scrubbed against the surface 85. Also, this seal shape accommodates side to side movement of the cover 10 without breaking contact with the surface, avoiding wear on the finish.

Figure 27:
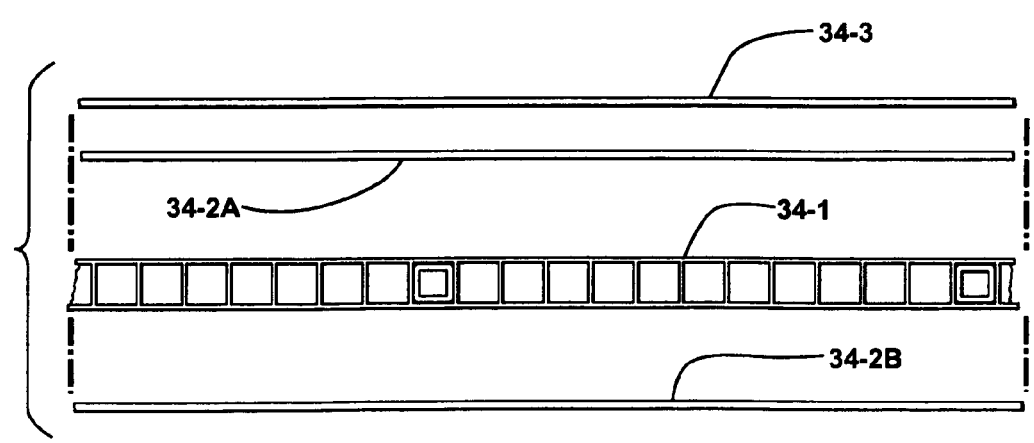
FIG. 27 is an exploded sectional fragmentary view of a panel incorporated in the hard tonneau cover system according to the invention.

FIG. 27 shows the construction of a panel 34. The core 34-1 preferably comprises a panel of corrugated plastic of the so called S-flute configuration, which has improved stiffness in a direction transverse to the lengthwise direction over a conventional parallel flute corrugated plastic panel. This lightweight material, which has good resistance to impacts, and also provides a greatly increased surface area for improved bonding of the reinforcing layers when compared to honeycomb cores previously used.

Such material is available under the trademark INTEPRO® from Inteplast Group, Ltd. Of Livingston, N.J.

Standard corrugated panels could also be used.

Additional layers 34-2A, 34-2B of a fiberglass material (FRP) is laminated to each face of the core 34-1.

These layers 34-2A, 34-2B could be smooth or texturized and colored particularly layer 34-2B.

An outer layer 34-3 of a color integrated film overlies the upper laminated layer 34-2A. This film is of a type available in colors matching automotive paints and of a class "A" quality from GE Plastics under the mark LEXAN® or SLX™ in thicknesses of 0.075 mm to 1.5 mm. A loose lay technique is preferred, in which the film 34-3 is trapped beneath the trim strips but is otherwise not fastened to better present a flat, class A appearance surface.

This also allows easy removal of the film for changing colors of for replacement. Graphic imprints can also be easily incorporated on the film 34-3.

Figure 28:
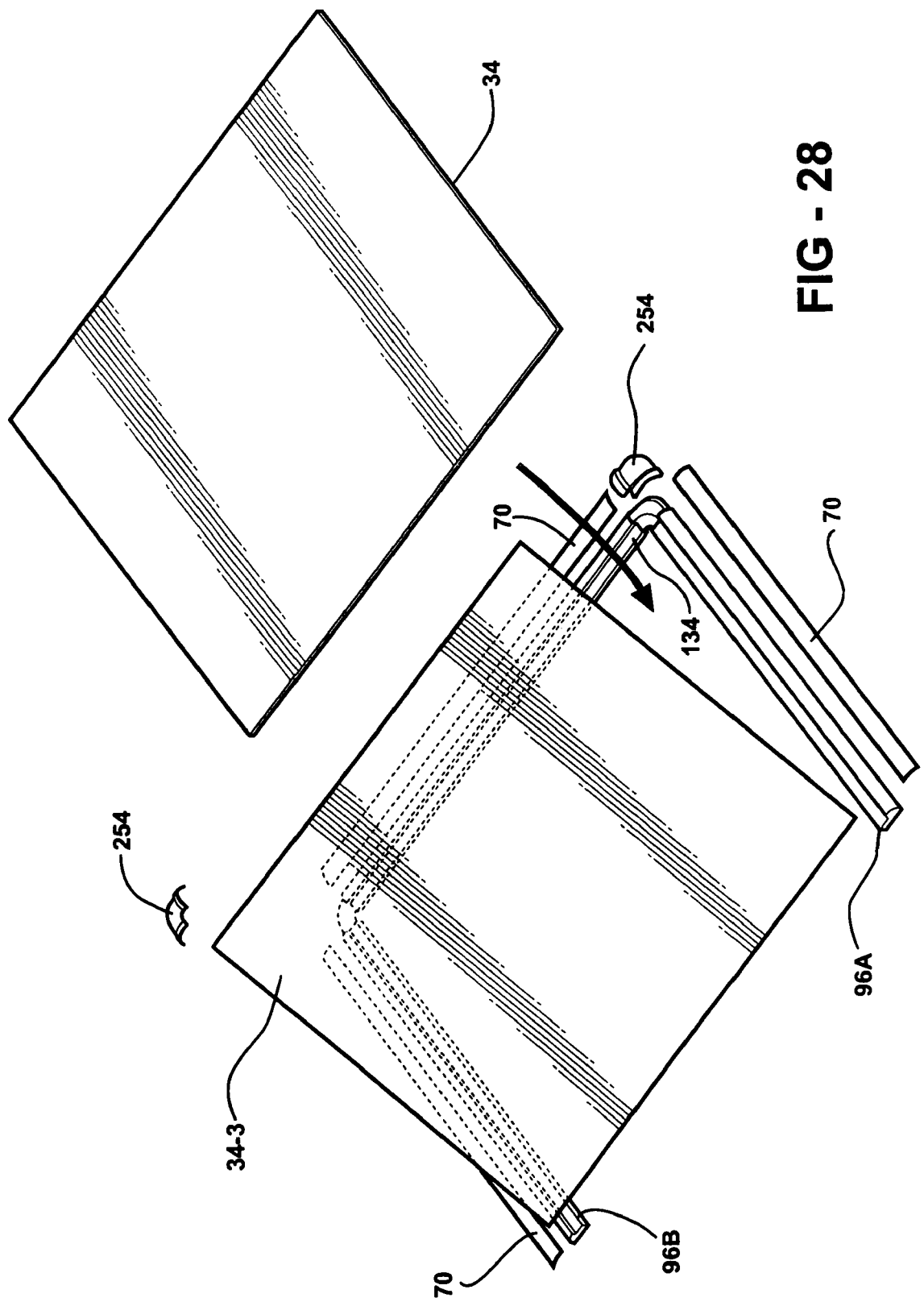
FIG. 28 is an exploded pictorial view of components of one section of a tonneau cover with a panel removed therefrom.

FIG. 28 illustrates the ease of changing an entire panel 34 or a color film 34-3 by simply sliding out the upper trim strips 70 from the perimeter rails and removing corners 254.

Figure 30:
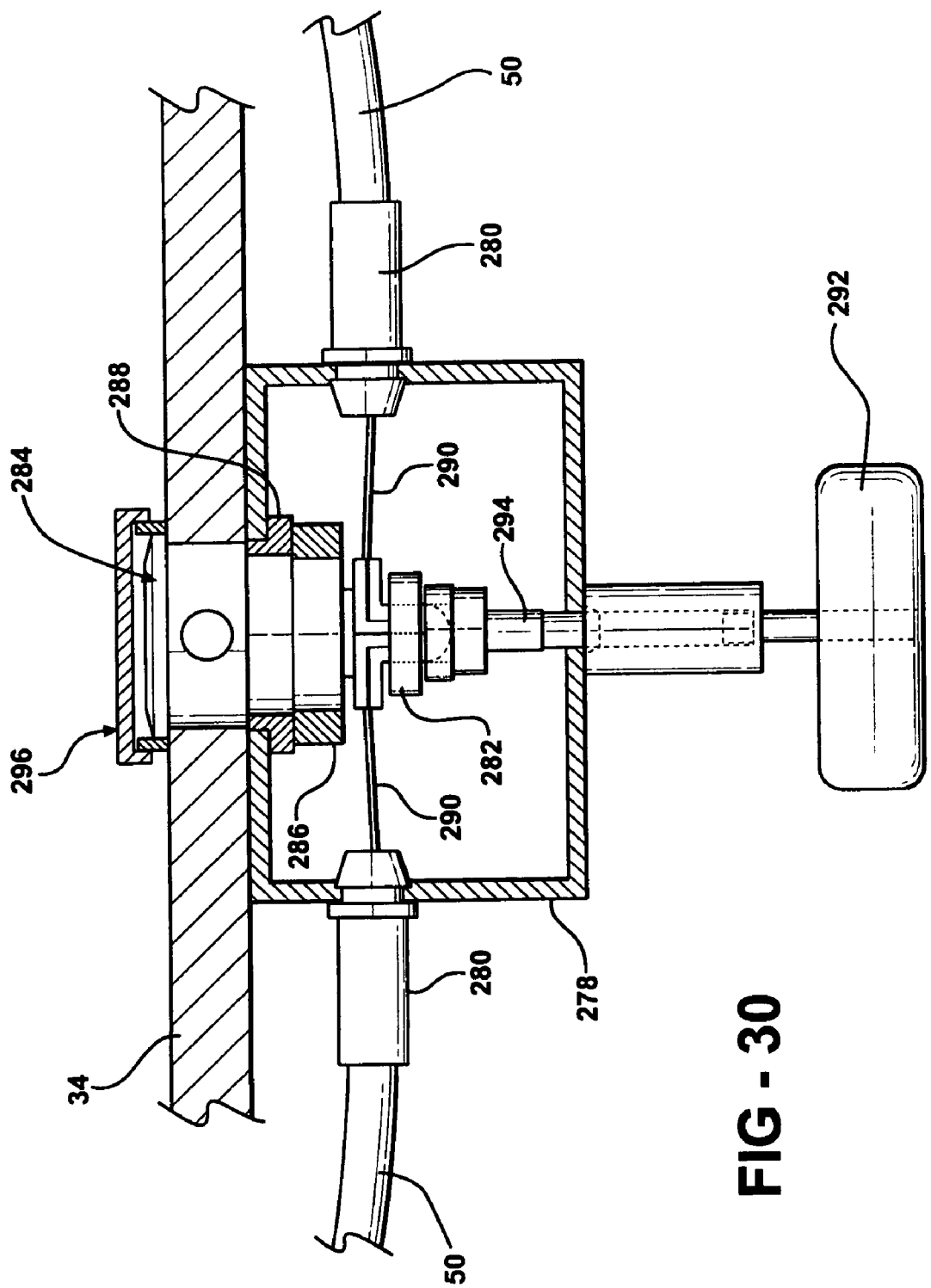
FIG. 30 is a plan view of a lock assembly used to operate the latch mechanism included in the hard tonneau cover according to the invention.

One of the lock assemblies 276 is shown in FIG. 30, mounted to a panel 34. Cables 50 are attached to a lock housing 278 by fittings 280 holding the outer cable casing. The actuation wires 290 extend to a respective end of a swivel bar 282 and are connected thereto.

A commercially available lock cylinder 284 is mounted within a can 286 secured with a lock nut 280. Insertion of a key allows rotation of the bar 282 to pull wires 290 and release the connected latches 58.

This allows the associated cover section 12 or 14 to be swung up to obtain access to the cargo box 60.

A glow-in-the-dark plastic key 292 protrudes downwardly from the housing 278 which connected to an extension rod 294 to allow a child to open the latches 58 if he or she is trapped in the cargo box, providing a safety feature.

A weather cap 296 can be snap fit over the lock face as shown to prevent water from penetrating the lock and causing freezing, etc.

The invention claimed is:

1. A hard tonneau cover for the cargo box of a pick-up truck comprising:

a framework configured to be fit to said cargo box;

a mounting system attaching said framework to said cargo box;

a panel overlying said framework to cover the same; said panel extending over a series of perimeter rails included in said framework;

said panel nonfixedly held on said framework with an edge clearance freely allowing thermal expansion and contraction.

2. The assembly according to claim 1 wherein said perimeter rails have one or more trim trips secured to an outer surface to cover said rails and extend over a perimeter of said panel to nonfixedly hold said panel on said framework.

3. The assembly according to claim 1 wherein each of said perimeter rails includes a slot slidably mating with a lengthwise feature on said strips so as to retain the same thereon.

4. The assembly according to claim 2 wherein said perimeter rails are each formed with a ledge surface on which an associated panel perimeter rests with an endwise clearance freely allowing said thermal expansion of said panel.

* * * * *